United States Patent
Amin

(10) Patent No.: US 11,490,699 B2
(45) Date of Patent: Nov. 8, 2022

(54) PORTABLE SUNSHADE AND SLIP-ON MOUNTING BASE

(71) Applicant: Malahat M. Amin, Tracy, CA (US)

(72) Inventor: Malahat M. Amin, Tracy, CA (US)

( * ) Notice: Subject to any disclaimer, the term of this patent is extended or adjusted under 35 U.S.C. 154(b) by 0 days.

(21) Appl. No.: 17/151,589

(22) Filed: Jan. 18, 2021

(65) Prior Publication Data

US 2021/0219680 A1     Jul. 22, 2021

Related U.S. Application Data

(60) Provisional application No. 62/963,450, filed on Jan. 20, 2020.

(51) Int. Cl.

| | |
|---|---|
| *A45B 11/00* | (2006.01) |
| *E04H 15/02* | (2006.01) |
| *A45B 25/24* | (2006.01) |
| *A45B 23/00* | (2006.01) |
| *H02S 30/20* | (2014.01) |
| *H02S 40/34* | (2014.01) |
| *H02S 10/40* | (2014.01) |
| *H02J 7/35* | (2006.01) |

(52) U.S. Cl.
CPC .............. *A45B 11/00* (2013.01); *A45B 23/00* (2013.01); *A45B 25/24* (2013.01); *E04H 15/02* (2013.01); *H02S 10/40* (2014.12); *H02S 30/20* (2014.12); *H02S 40/34* (2014.12); *A45B 2023/0068* (2013.01); *A45B 2200/1027* (2013.01); *H02J 7/35* (2013.01)

(58) Field of Classification Search
CPC ............ A47C 7/66; A45B 11/00; E04H 15/02
See application file for complete search history.

(56) References Cited

U.S. PATENT DOCUMENTS

| | | |
|---|---|---|
| 2,932,833 A | 4/1960 | Wambach |
| 3,243,230 A | 3/1966 | Otto |
| 4,030,748 A | 6/1977 | Brock |
| 4,295,481 A | 10/1981 | Gee |
| 4,300,798 A | 11/1981 | Musgrove et al. |
| 4,639,036 A | 1/1987 | Nichols |
| 4,639,958 A | 2/1987 | Lerner |

(Continued)

FOREIGN PATENT DOCUMENTS

WO     WO 1999/018825     4/1999

*Primary Examiner* — Noah Chandler Hawk

(74) *Attorney, Agent, or Firm* — Makoui Law, PC; Ali Makoui

(57) ABSTRACT

An article for providing shade includes a sunshade and a slip-on mounting base. The sunshade includes a shield, a set of ribs connected to the shield, and a plurality of support arms connected to the shield. The slip-on mounting base includes a body that defines a cavity and an opening. The body is configured to slip on the back portion of an item of outdoor furniture into the cavity through the opening. The body is stretchable and is configured to stretch to receive the back portion of different items of outdoor furniture with different sizes. The slip-on mounting base includes a plurality of receptacles attached to the body. Each receptacle includes an opening to receive a support arm of the sunshade. Each receptacle holds the corresponding support arm such that the shield, when unfolded, covers at least a portion of the back portion of the item of outdoor furniture.

20 Claims, 16 Drawing Sheets

(56) References Cited

U.S. PATENT DOCUMENTS

| | | | | |
|---|---|---|---|---|
| 4,687,249 | A | 8/1987 | Mills | |
| 4,789,200 | A | 12/1988 | Munguia | |
| 4,924,896 | A * | 5/1990 | Carter | A47C 7/66 135/117 |
| 5,000,210 | A | 3/1991 | Worthington, Jr. | |
| 5,022,420 | A * | 6/1991 | Brim | A01D 67/02 280/47.38 |
| 5,080,432 | A * | 1/1992 | Connell | A47C 7/66 297/184.15 |
| 5,116,288 | A | 5/1992 | Kondo et al. | |
| 5,154,473 | A * | 10/1992 | Joranco | A47C 7/66 135/96 |
| 5,255,954 | A | 10/1993 | Rogers | |
| 5,320,405 | A | 6/1994 | Foster et al. | |
| 5,397,268 | A | 3/1995 | Chang et al. | |
| 5,441,067 | A | 8/1995 | James et al. | |
| 5,515,564 | A | 5/1996 | Lyons | |
| 5,638,852 | A | 6/1997 | Dean | |
| 5,641,197 | A | 6/1997 | Springmann | |
| 5,791,362 | A | 8/1998 | Seiger | |
| 5,797,650 | A | 8/1998 | Gonzalez, Jr. et al. | |
| 5,967,601 | A * | 10/1999 | Gillins | A47C 7/66 135/96 |
| 6,293,292 | B1 | 9/2001 | Watzke | |
| 6,789,557 | B1 | 9/2004 | Wahl, Jr. | |
| 7,048,333 | B2 | 5/2006 | Martinez | |
| 7,082,883 | B1 * | 8/2006 | Arias | A47C 31/11 108/90 |
| 7,175,231 | B2 | 2/2007 | Gallo | |
| 7,302,957 | B2 | 12/2007 | Ross | |
| 7,753,063 | B1 | 7/2010 | Laws | |
| 8,991,410 | B2 | 3/2015 | Surek et al. | |
| 9,321,330 | B2 | 4/2016 | Richman | |
| 9,629,470 | B2 * | 4/2017 | Bussell | A47C 7/666 |
| 9,713,386 | B2 | 7/2017 | Pawlikoski | |
| 9,874,038 | B2 | 1/2018 | Pashandi | |
| 10,151,120 | B1 | 12/2018 | Kaneshiro | |
| 10,477,930 | B2 | 11/2019 | Kuypers et al. | |
| 2002/0112752 | A1 * | 8/2002 | Blakney | E04H 15/003 135/96 |
| 2003/0106577 | A1 | 6/2003 | Martinez | |
| 2008/0185028 | A1 | 8/2008 | Ayers et al. | |
| 2011/0181078 | A1 * | 7/2011 | Kelly | A47C 4/286 297/391 |
| 2013/0249202 | A1 | 9/2013 | White et al. | |
| 2016/0010358 | A1 | 1/2016 | Ashley | |
| 2017/0265646 | A1 * | 9/2017 | Rowe, Jr. | E04H 15/46 |

* cited by examiner

PORTABLE SUNSHADE AND SLIP-ON MOUNTING BASE

CLAIM OF BENEFIT TO PRIOR APPLICATIONS

This application claims the benefit of U.S. Provisional Patent Application Ser. No. 62/963,450, filed on Jan. 20, 2020. The contents of U.S. Provisional Patent Application 62/963,450 are hereby incorporated by reference.

TECHNICAL FIELD

The present embodiments relate to shading devices. In particular, the present embodiments relate to sunshades and mounting bases that are collapsible for convenient transport and storage.

BACKGROUND

Extended exposure to direct rays of sun may cause discomfort and potential dangers such as irritation to facial skin, irritation of the eyes, sunburn, heat exhaustion, and premature facial ageing. Sunshades are used to provide shade and protection from the harmful rays of sun. Sunshades have been provided that are permanently fitted and fixed to a particular outdoor furniture item. These sunshades have the drawback of being configured for a particular piece of furniture and may not be portable to other pieces of furniture with different sizes.

Portable sunshades have also been provided to connect to different furniture items. In order to attach these sunshades to furniture items with different shapes and sizes, locking and unlocking hardware such as hooks, clamps, pins, brackets clips, nuts, bolts, washers, hook-and-loop fasteners (e.g., Velcro), straps, and/or ropes have been used to compensate for different dimensions of the furniture items. Such mechanisms are often difficult to install and the corresponding components may be bulky and inconvenient to carry. Furthermore, whenever any of these hardware components is lost, the sunshade may be rendered inoperative until the component is replaced.

BRIEF DESCRIPTION OF THE DRAWINGS

The various embodiments of the present embodiments now will be discussed in detail with an emphasis on highlighting the advantageous features. These embodiments depict the novel and non-obvious of portable sunshades with slip-on mounting bases shown in the accompanying drawings, which are for illustrative purposes only. These drawings include the following figures, in which like numerals indicate like parts.

DETAILED DESCRIPTION

Figure 1:
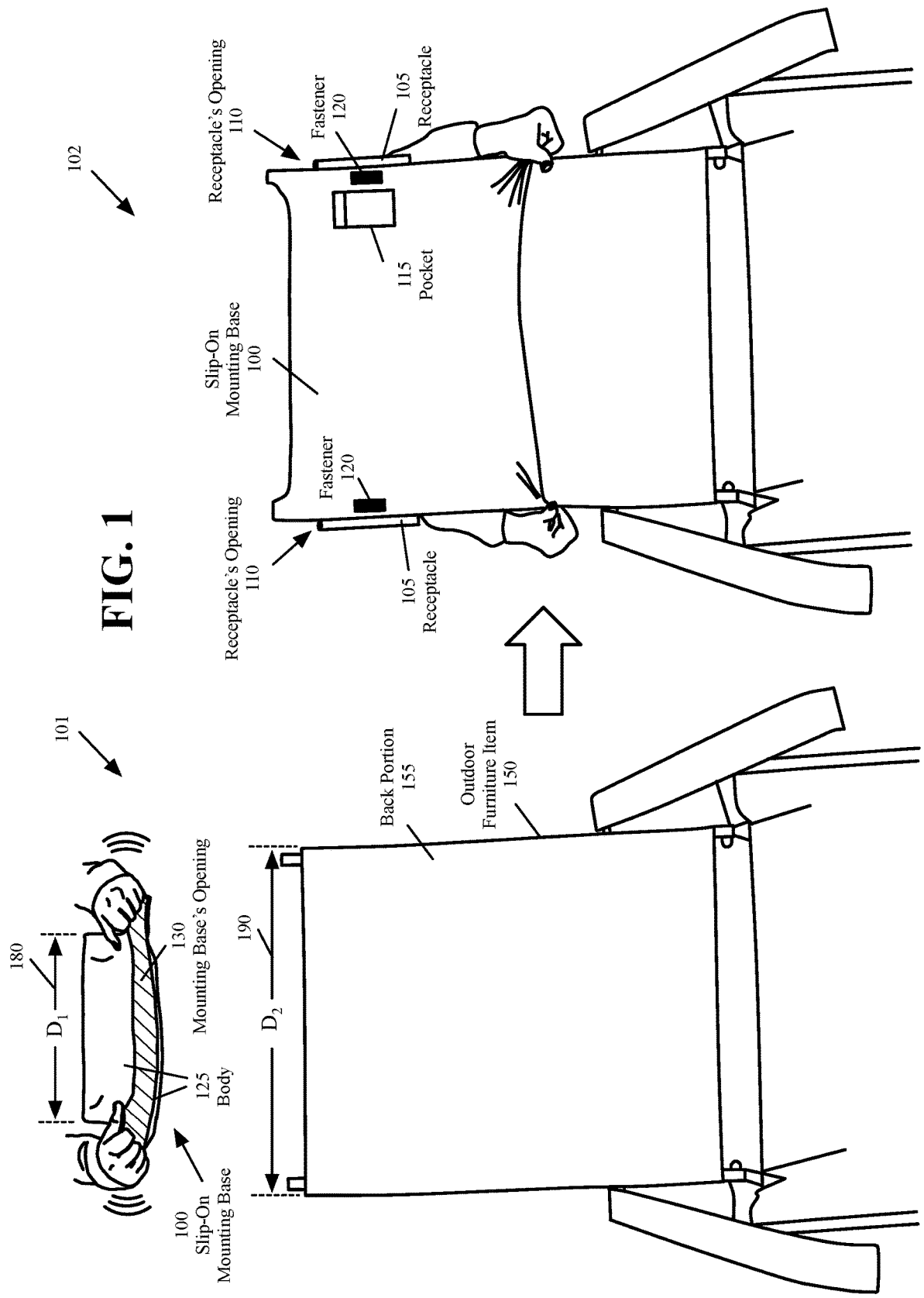
FIG. 1 illustrates perspective views of a sunshade slip-on cover mounting base being stretched and fitted on the back of an item of outdoor furniture according to various aspects of the present embodiments.

Sunshades, also referred to as sun shades or shades, are used to provide protection and comfort from the rays of the sun. Portable sunshades are used to provide shade either by attaching them to outdoor furniture or using them as standalone personal sunshades.

One aspect of the present embodiments includes the realization that the previously provided sunshades are difficult to attach to outdoor furniture. Sunshades have been provided to attach a particular piece of furniture, which makes these sunshades unusable on furniture with different sizes and dimensions. Sunshades have also been provided to attach to different pieces of furniture by fixtures such as screws and brackets, which makes it inconvenient and time consuming to remove the sunshades from one piece of furniture and attach them to another piece of furniture.

Portable sunshades have also been provided to attach to different pieces of furniture. These sunshades use different types of locking and unlocking hardware to adjust the distance needed to lock them into the positions required for attaching to different size of furniture. Different hardware pieces such as hooks, clamps, pins, clips, nuts, bolts, washers, hook-and-loop fasteners, straps, and/or ropes have been used to compensate for different dimensions of the furniture items and/or to attach the sunshades to the furniture. Such mechanisms are often difficult to install and the corresponding components may be bulky and inconvenient to carry. Another shortcoming of the sunshades in the past is that whenever any of these components is lost, the sunshade may be rendered inoperative until the component is replaced.

The present embodiments, as described in detail below, solve the above-mentioned shortcomings by providing a slip-on mounting base that is stretchable to fit the back of different pieces of furniture. The slip-on mounting base may include two or more receptacles that may receive and hold support arms that are attached to a sunshade.

The slip-on mounting base may include a body made of stretchable material. The body may include an opening and a cavity. The body may be stretched and slipped on the back portion of different pieces of furniture. The slip-on mounting bases of the present embodiments do not require any additional hardware such as hooks, clamps, pins, clips, nuts, bolts, washers, hook-and-loop fasteners, straps, and/or ropes to attach to furniture. The slip-on mounting base, in some embodiments, may be converted to a carrying case.

The present embodiments further provide several different type of sunshades that may be attached to the slip-on mounting base. The sunshades may be unfolded and adjusted to provide shade and privacy. The sunshades may, in some embodiments, be attached to support arms that may allow rotating and adjusting the position of the sunshade. The sunshades may be folded and fitted in the slip-on mounting base for carrying.

The slip-on mounting base of the present embodiments may be used as a standalone mounting base. The slip-on mounting base may be placed on a surface, such as ground, grass, sand, cement, concrete, wood, etc., and a sunshade may be attached to the slip-on mounting base. The sunshades, in some embodiments, may include solar cells and may provide a power adapter to charge different electronic devices such as cell phones, tablet computers, laptop computers, cameras, etc.

The remaining detailed description describes the present embodiments with reference to the drawings. In the drawings, reference numbers label elements of the present embodiments. These reference numbers are reproduced below in connection with the discussion of the corresponding drawing features.

Some of the present embodiments provide a slip-on mounting base. The slip-on mounting base may be made of stretchable fabric that may be stretched to fit the back portion of different furniture items without the use of any hardware such as clamps, brackets, ropes, straps, etc. The slip-on mounting base may be made of natural and/or synthetic fiber. The slip-on mounting base may be made of woven and/or nonwoven fabric. The slip-on mounting base may include receptacles for receiving the support arms of a sunshade. FIG. 1 illustrates perspective views of a slip-on cover mounting base being stretched and fitted on the back of an item of outdoor furniture according to various aspects of the present embodiments.

With reference to FIG. 1, the slip-on mounting base 100 may be made of stretchable fabric such as for example, and without limitations, one or more of nylon, spandex, elastane, polyether-polyurea copolymer, thermoplastic, rubber, etc. The stretchable fabric, in some embodiments, may be a 4-way stretch fabric that may both stretch crosswise and lengthwise. The stretchable fabric, in some embodiments, may be a 2-way stretch fabric that may stretch to increase an opening to the skip-on mounting base.

FIG. 1, as shown, includes two stages 101 and 102. In stage 101, the slip-on mounting base 100 is being stretched to fit the back portion 155 of an outdoor furniture item 150. The slip-on mounting base 100 may include a body 125 that has an opening 130 and a hollow interior or cavity. The body 125 may be made of one or more pieces of fabric and may include two opposite sides connected together to make the cavity and the opening. As shown in the example of FIG. 1, the width, $D_1$, of the slip-on mounting base 100 may be less than the width, $D_2$, of the back portion 155 of the outdoor furniture item 150. However, by stretching the body 125 of the slip-on mounting base 100, the opening 130 is stretched to the width of the back portion 155 of the furniture item 150.

As shown in stage 102, the slip-on mounting base 100 may be slipped on the back portion 155 of the furniture item 150 such that the body 125 may receive the back portion 155 of the furniture item into the cavity through the opening 130. Once the slip-on mounting base 100 is slipped on, the slip-on mounting base 100 may snuggly hold to the back portion 155 of the furniture item 150. The slip-on mounting base 100 may further include two or more receptacles 105.

As described further below, the receptacles 105 may be used to receive the supporting arms of a sunshade. The stretchable body of the slip-on mounting base 100 of the present embodiments provides the technical advantage over the previous mechanisms for attaching sunshades to furniture items in that the slip-on mounting base 100 does not require any hardware such as hooks, clamps, pins, clips, brackets, nuts, bolts, washers, fasteners, straps, ropes, etc., to fit back portions of different furniture items that may have different sizes and dimensions.

The slip-on mounting base 100 of the present embodiments does not require measuring to fit a particular shape of furniture and may fit the back portion of outdoor furniture items as diverse as, for example, and without limitations, lounges, chaises, chairs, Adirondack chairs, etc. The furniture items may, for example, and without limitations, include cushions, fabric (such as e.g., sling lounges/chaises/chairs), straps, etc.

The receptacles 105 of the slip-on mounting base 100 of the present embodiments provide the technical advantage of enabling different types and shapes of sunshades to be attached to the slip-on mounting base 100. As described below, as long as the sunshades include supporting arms that may fit into the receptacles' openings 110, the sunshades may be attached to the slip-on mounting base 100.

With further reference to FIG. 1, the slip-on mounting base 100 may optionally include a pocket 115 for storing personal items such as keys, currency, wallets, cells phones, etc. The pocket 115 may store items that are substantially the size of a wallet or a cell phone. As described below, after a sunshade is attached to the slip-on mounting base 100, a person may place personal items in the pocket and lower the sunshade to hide the pocket, before the person leaves the outdoor furniture item (e.g., to go swimming).

With further reference to FIG. 1, the slip-on mounting base 100 may optionally include one or more fasteners 120 to further secure a sunshade to the slip-on mounting base 100. The fasteners 120 may be, for example, and without limitations, hook-and-loop fasteners (e.g., the hook-and-loop fasteners provided by Velcro company), buckle straps, snap buttons, etc. In the example of FIG. 1, the fasteners 120 are hook-and-loop fasteners. It should be noted that no fasteners or other hardware items are needed to attach the slip-on mounting base 100 or the sunshades of the present embodiments to pieces of furniture. The optional fasteners 120, as described below, may be used to further secure the sunshades to the slip-on mounting base 100.

Figure 2:
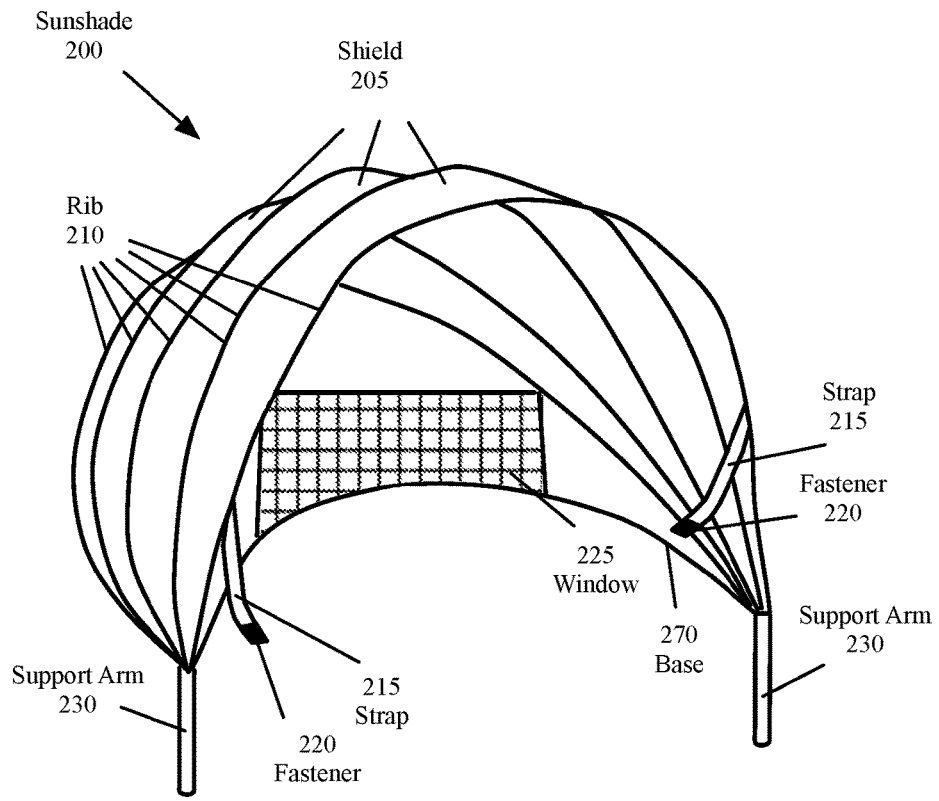
FIG. 2 is a perspective view of a foldable sunshade that may be attached to a slip-on mounting base, according to various aspects of the present embodiments.

FIG. 2 is a perspective view of a foldable sunshade that may be attached to a slip-on mounting base, according to various aspects of the present embodiments. With reference to FIG. 2, the sunshade 200 may include several ribs 210 that may be connected to and support a shield 205. The shield may be made of material such as, for example, and without limitation, nylon, vinyl, felt, canvas, polycotton, and/or polyester. The shield, in some embodiments, may include material, and/or may be treated with material, that provides ultraviolet (UV) light protection.

The ribs 210 may be made of flexible material such as, for example, and without limitations, metal (e.g., steel, aluminum, etc.), rubber, carbon fiber, and/or fiberglass. The ribs, in some embodiments, may be made of very thin flexible metal that may allow the ribs to easily fold or unfold. In the example of FIG. 2, the ribs 210 may have a substantially U shape with two ends (or tips). The ribs 210 may be flexible straight ribs that may be curved into the U shape form. In some embodiments, the sunshade 200 may include a rib across the curved shaped base 270 of the shield 205. In other embodiments, the base 270 of the shield 205 may not include a rib.

As shown, each end of the ribs 210 may be close to a corresponding end of the other ribs. Some embodiments may include a pair of rivets or joints (not shown). Each rivet may pivotally attach to one end of each rib. In some embodiments, the shield 205 may include two layers and the ends of the ribs 201 may be kept together between the two layers of the shield without the ends of the ribs being connected together.

The sunshade 200 may include one or more support arms 230. The support arms 230 may be made of, for example, and without limitations, wood, straw, metal, plastic, rubber, carbon fiber, fiberglass, and/or polyvinyl chloride (PVC). The support arms 230 may be configured to be inserted into the receptacles 105 of the slip-on mounting base 100 (FIG. 1). For example, each support arms 230 may have a diameter (or thickness) that is slightly smaller than the width of a receptacle 105 such that a support arm 230 may snuggly fit into the receptacle through the receptacle's opening 110.

The sunshade 200 and other sunshades of the present embodiments, for example, and without limitations, the sunshade 600 (FIG. 6), the sunshade 900 (FIG. 9), the sunshade 1100 (FIG. 12), and the sunshade 1300 (FIG. 14) may include different types of support arms that may allow the position of the sunshades to be adjusted to provide shade when the back of an item of furniture (e.g., the back 155 of the item of furniture 150 of FIG. 1) is in a vertical position, a horizontal position, or a position between the vertical and horizontal positions.

Figure 3A:
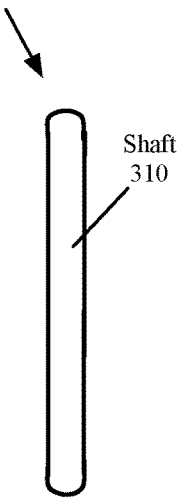
FIGS. 3A-3C are side elevation views of three examples of sunshades' support arms, according to various aspects of the present embodiments.
Figure 3B:
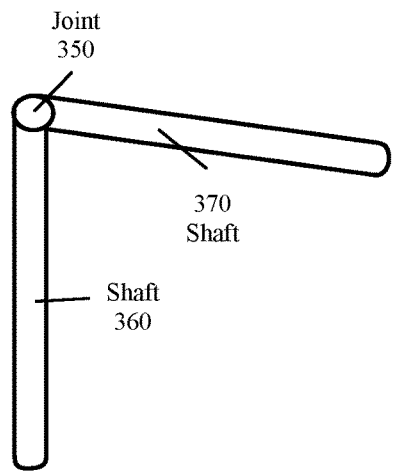
Figure 3C:
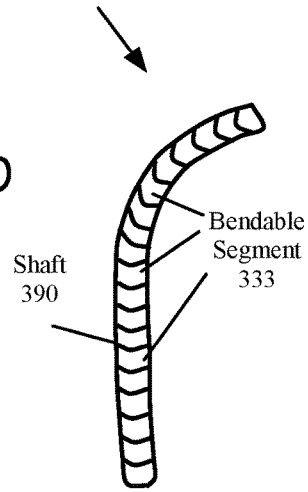

FIGS. 3A-3C are side elevation views of three examples of sunshades' support arms, according to various aspects of the present embodiments. With reference to FIG. 3A, the support arm 301 may include a single shaft 310. The support arm 301 may be used, for example, and without limitations, for a shield (such as the shield 200 of FIG. 2) that includes ribs that may rotate close to 180 degrees, allowing the ribs to rotate the shield to provide shade as the back of a furniture item is rotated between the vertical and horizontal positions.

With reference to FIG. 3B, the support arm 302 may include multiple shafts 360-370. Although two shafts 360-370 are shown, the support arm 302 may include more than two shafts. As shown, each shaft 360-370 may be connected to the adjacent shaft by a joint (or rivet) 350. During operation, one of the shafts (e.g., the shaft 360) may be inserted into a receptacle 105 of a slip-on mounting base 100 (FIG. 1) and the other shaft 370 may be connected to a shield (e.g., the shield 200 of FIG. 2), allowing the shield to be rotated to provide shade as the back of a furniture item is rotated between the vertical and horizontal positions. In some embodiments, the shaft 370 may be directly connected to the shield. In other embodiments, the shaft 370 may be connected to the shield by another joint or rivet.

The joint 350, in some embodiments, may be lockable. For example, when the shafts 360 and 370 are adjusted at a desired angle with respect to each other, the joint 350 may be locked to hold the shafts at the desired angle. As an example, the joint 350 may be locked by rotating the joint in one direction and may be unlocked by rotating the joint 350 in the opposite direction. As another example, the joint 350 may be locked by pushing the join 350 in one direction and may be unlocked by pulling the joint 350 in the opposite direction.

With reference to FIG. 3C, the support arm 303 may include a flexible shaft 390. The flexible shaft 390 may be a gooseneck shaft. The shaft 390 may include a spring inside, which may be made of a high-strength metal such as steel to provide flexibility. The flexible shaft 390 may include a layer of soft cover compressed over the gaps of the spring's coil to create the bendable segments 333 to allow the shaft 390 to be bended and hold its position.

During operation, one end of the shaft 390 may be inserted through the opening 110 of a receptacle 105 of a slip-on mounting base 100 (FIG. 1) and the other end of the shaft 390 may be connected to the shield (e.g., the shield 200 of FIG. 2), allowing the position of the shield to be adjusted to provide shade as the back of a furniture item is rotated between the vertical and horizontal positions.

With further reference to FIG. 2, the sunshade 200, in some embodiments, may optionally include a window 225 to allow air to circulate inside the shield and/or to allow wind to pass through the shield 205. The sunshade 200, in some embodiments, may optionally include one or more of straps 215 that each may include a fastener 220 to further secure a sunshade 200 to the slip-on mounting base 100 of FIG. 1.

The fasteners 220 may be, for example, and without limitations, hook-and-loop fasteners, buckle straps, snap buttons, etc. As mentioned above, no fasteners or other hardware items are needed to attach the slip-on mounting base 100 or the sunshades of the present embodiments to pieces of furniture. The optional fasteners 120 (FIG. 1) and 220 (FIG. 2), may be used to further secure the sunshades to the slip-on mounting base 100 after the support arms of the sunshade are inserted into the receptacles 105 of the slip-on mounting base 100.

Figure 4:
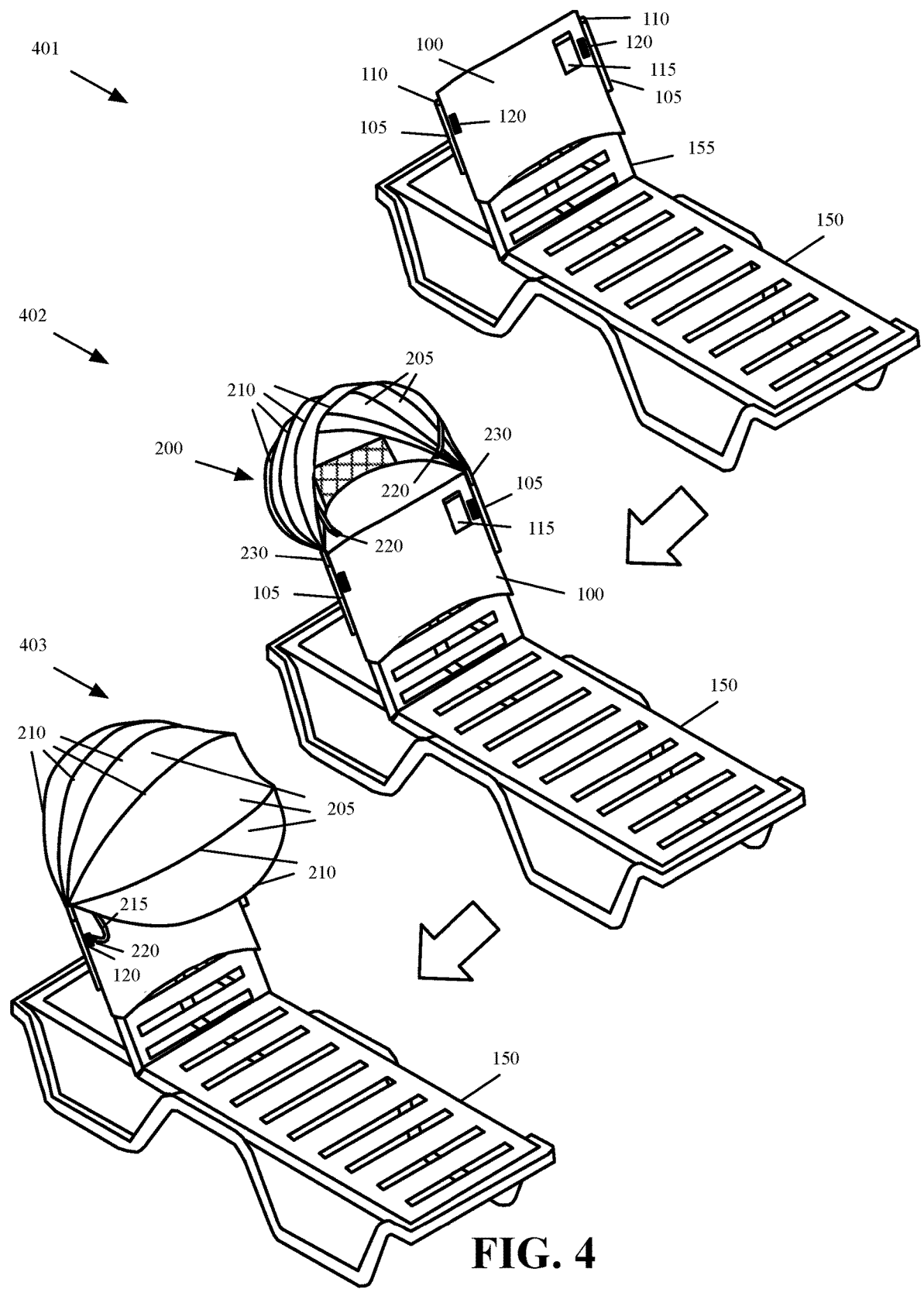
FIG. 4 illustrates perspective views of a sunshade and a slip-on mounting base that are attached to an item of outdoor furniture, according to various aspects of the present disclosure.

FIG. 4 illustrates perspective views of a sunshade and a slip-on mounting base that are attached to an item of outdoor furniture, according to various aspects of the present disclosure. FIG. 4, in three stages 401-403, shows how a sunshade, such as the sunshade 200 of FIG. 2, may be attached to a slip-on mounting base 100 to provide shade.

In stage 401, a slip-on mounting base 100 may be slipped on the back portion 155 of a furniture item 150. The slip-on mounting base 100 may include the receptacles 105 with the openings 110. The slip-on mounting base 100 may include the optional pocket 115 and the optional fasteners 120.

In stage 402, the support arms 230 of the sunshade 200 may be inserted into the receptacles 105 of the slip-on mounting base 100 through the corresponding openings 110. As shown in stage 402, the ribs 210 may be close to each other and the shield 205 may be only partially unfolded. In this stage, the fasteners 220 may not be connected to the fasteners 105 of the slip-on mounting base 100 and the pocket 105 may be visible.

As shown in stage 403, the ribs 210 may be rotated to be further separate the ribs 210 from each other, resulting in the shield 205 to be further unfolded to provide shade and/or privacy. As shown, in this stage the pocket may not be visible (e.g., when a person leaves the furniture item 150). The fasteners 220 at the end of the straps 215 may be used to further secure the sunshade 200 to the slip-on mounting base 200.

It should be noted that the sunshade 200 may be stretched to fit on the back of different sizes of furniture. As described above with reference to FIG. 1, the slip-on mounting base 100 is stretchable to fit back portions of different sizes. Since the ribs of the sunshade 200 are flexible and the base 270 (FIG. 2) of the sunshade 200 is curved, the support arms 230 may be pulled apart or pushed towards each other to fit the receptacles 105 of the slip-on mounting base 100 as the slip-on mounting base 100 is stretched to fit different sizes of furniture.

Figure 5:
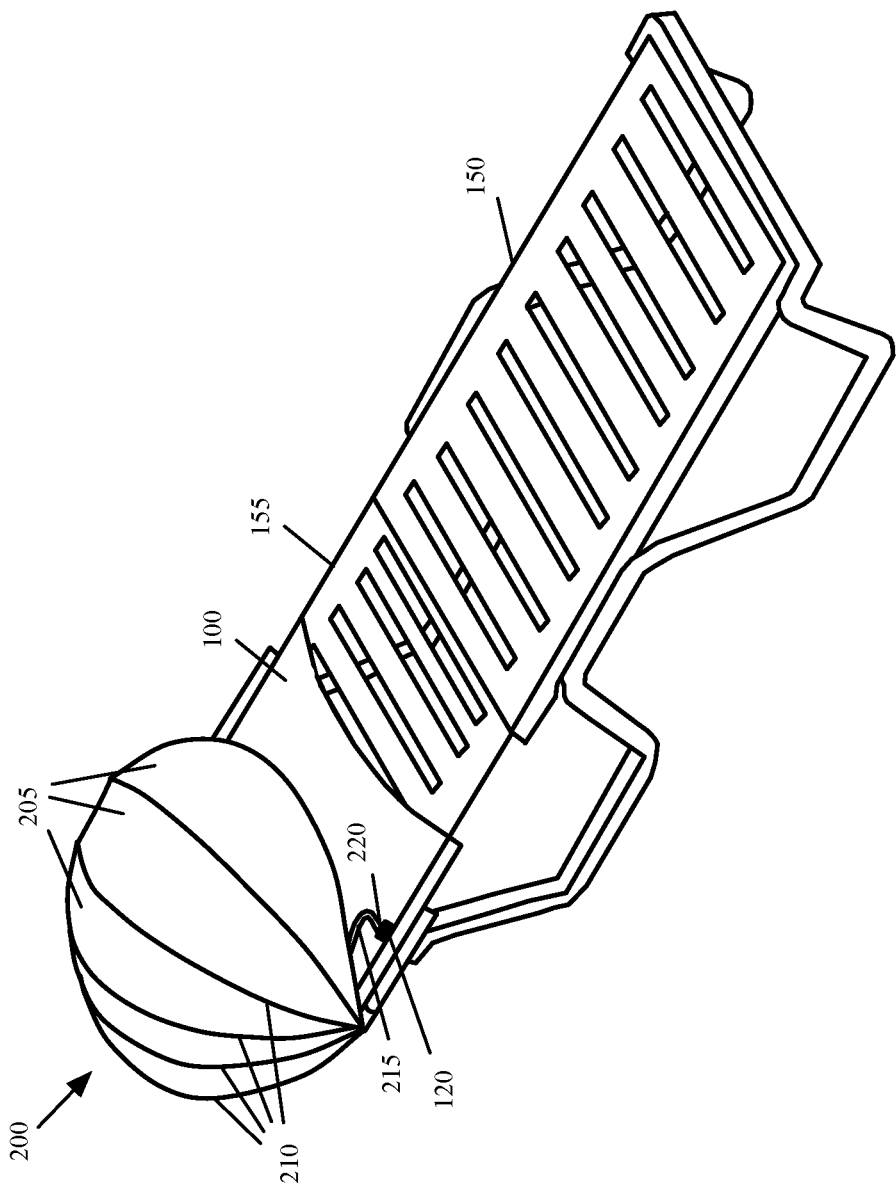
FIG. 5 illustrates a perspective view of the sunshade and the slip-on mounting base of FIG. 4 after the back portion of the outdoor furniture item is lowered, according to various aspects of the present disclosure.

FIG. 5 illustrates a perspective view of the sunshade and the slip-on mounting base of FIG. 4 after the back portion of outdoor furniture item is lowered, according to various aspects of the present disclosure. With reference to FIG. 5, the back portion 155 of the furniture item may be lowered, for example, to allow the user (not shown) to lie down.

As shown, the sunshade 200 may still provide shade and/or privacy after the back portion 155 of the furniture item 150 is lowered. For example, in some embodiments, the sunshade 200 may have support arms similar to the support arm 301 of FIG. 3A. In these embodiments, the ribs 210 of the sunshade 200 may be rotated away from each other such that the shield 205 is further unfolded to provide shade.

In some embodiments, the sunshade 200 may have support arms similar to the support arm 302 of FIG. 3B. In these embodiments, in addition to, or in lieu of, rotating the ribs 210 against each other, the shaft 370 may be rotated around the joint 350 to rotate the sunshade 200 to a proper position to provide shade.

In some embodiments, the sunshade 200 may have support arms similar to the support arm 303 of FIG. 3C. In these embodiments, in addition to, or in lieu of, rotating the ribs 210 against each other, the shaft 390 may be bended to place the sunshade 200 at a desired position to provide shade and/or privacy.

Figure 6:
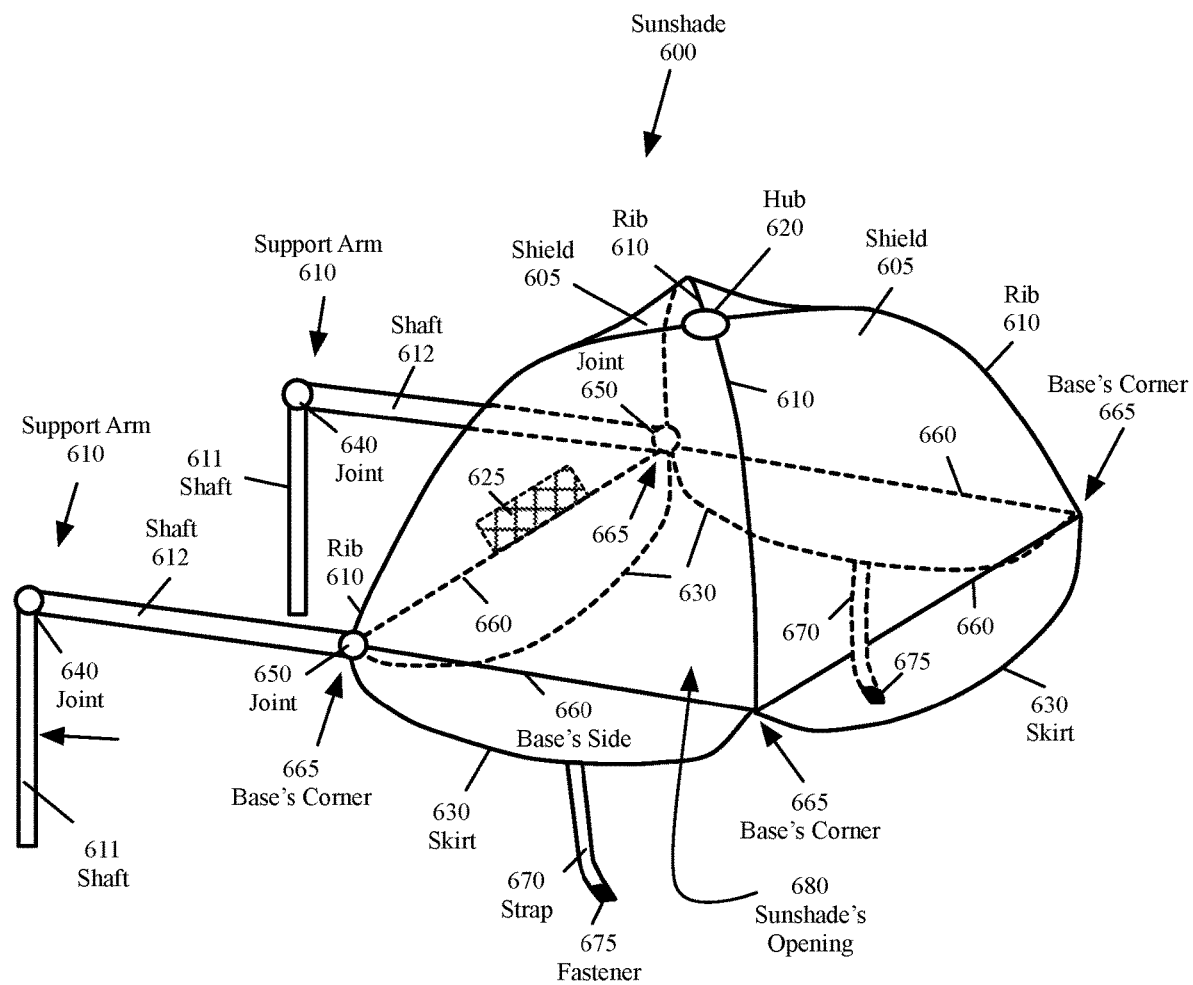
FIG. 6 is a perspective view of a dome shaped foldable sunshade that may be attached to a slip-on mounting base, according to various aspects of the present embodiments.

The slip-on mounting base of the present embodiments may be used to attach different types and shapes of sunshades to furniture items. FIG. 6 is a perspective view of a dome shaped foldable sunshade that may be attached to a slip-on mounting base, according to various aspects of the present embodiments. With reference to FIG. 6, the sunshade 600 may include a polygon shaped base with several sides 660 and several corners 665. The sunshade 600, in other embodiments, may include a different shape base (e.g., a substantially circular, elliptical, or curvilinear shape).

With reference to FIG. 6, the base's sides 660 may be made of flexible material such as, for example, and without limitations, metal (e.g., steel, aluminum, etc.), rubber, carbon fiber, and/or fiberglass. The base's sides, in some embodiments, may be made of very thin flexible metal that may allow the base's sides to easily fold or unfold. The shield 605 may be connected to the base's sides 660. For example, in some embodiments, the shield 605 may be sewn or pressed (depending on the shield's material) around the base's sides 660.

The sunshade 600 may include several ribs 610 that may be connected to and support a shield 605. The shield 605, in some embodiments, may include several skirts 630 to provide additional shade and/or privacy. For example, each skirt 630 may be connected to one of the base's sides 660. The shield 605 may be made of material such as, for example, and without limitation, nylon, vinyl, felt, canvas, polycotton, and/or polyester. The shield, in some embodiments, may include material, and/or may be treated with material, that provides ultraviolet (UV) light protection.

The ribs 610 may be made of flexible material such as, for example, and without limitations, metal (e.g., steel, aluminum, etc.), rubber, carbon fiber, and/or fiberglass. The ribs 610, in some embodiments, may be made of very thin flexible metal that may allow the ribs 610 to easily fold or unfold.

The sunshade 600, in some embodiments, may include a hub 620. In some embodiment, there may be as many ribs 610 as the bases' corners 665. For example, in the embodiment of FIG. 6 where the base has four corners 665, the sunshade 600 may have four ribs. In these embodiments, one end (or tip) of each rib 610 may be connected to the hub 620 and the other end (or tip) of each rib 610 may be connected to one of the base's corners 665.

In other embodiments, the number of ribs may be half the number of the base's corners. For example, in the embodiments of FIG. 6 where the base has four corners 665, the sunshade 600 may have two ribs. In these embodiments, one end (or tip) of each rib 610 may be connected to one corner of the base and the other end (or tip) of each rib 610 may be connected to the corner 665 on the opposite side of the base. Some of these embodiments may not have a hub. The hub 620, in some embodiments, may be used to push the ribs 610 upwards when the sunshade 600 is unfolded and/or to pull the ribs 610 downwards when the sunshade 600 is folded. The ribs 610 may be flexible straight ribs that may be curved to connect a base's corner to the hub (or to connect to two opposite corners of the base).

With further reference to FIG. 6, the sunshade 600, in some embodiments, may optionally include a window 625 to allow air to circulate inside the shield (e.g., through the sunshade's opening 680) and/or to allow wind to pass through the shield 605. The sunshade 600, in some embodiments, may optionally include one or more of straps 670 that each may include a fastener 675 to further secure a sunshade 600 to the slip-on mounting base 100 of FIG. 1. The fasteners 620 may be, for example, and without limitations, hook-and-loop fasteners, buckle straps, snap buttons, etc.

The sunshade 600 may include one or more support arms. The support arms may be similar to the support arms 301 (FIG. 3A), 302 (FIG. 3B), or 303 (FIG. 3C). In the embodiment shown in FIG. 6, the support arms are similar to the support arms 302 of FIG. 3B. As shown, the sunshade 600 may include two support arms 610. In other embodiments, the sunshade 600 may include fewer or more support arms.

Each support arm 610 may include several shafts 611-612. The shaft 611 of each support arm may be connected to the adjacent shaft 612 by a joint 640. Each of the shafts 611 may be inserted into a receptacle 105 of a slip-on mounting base 100 (FIG. 1). Each of the shafts 612 may be connected to one of the sides 660 of the shield 605 allowing the shield 605 to be rotated around the joints 650 and/or the joints 640 to provide shade and/or privacy as the back of a furniture item is rotated between the vertical and horizontal positions. The joints 640 and 650, in some embodiments, may be locked and unlocked, for example, as described above with reference to the joint 350 of FIG. 3B.

Figure 7:
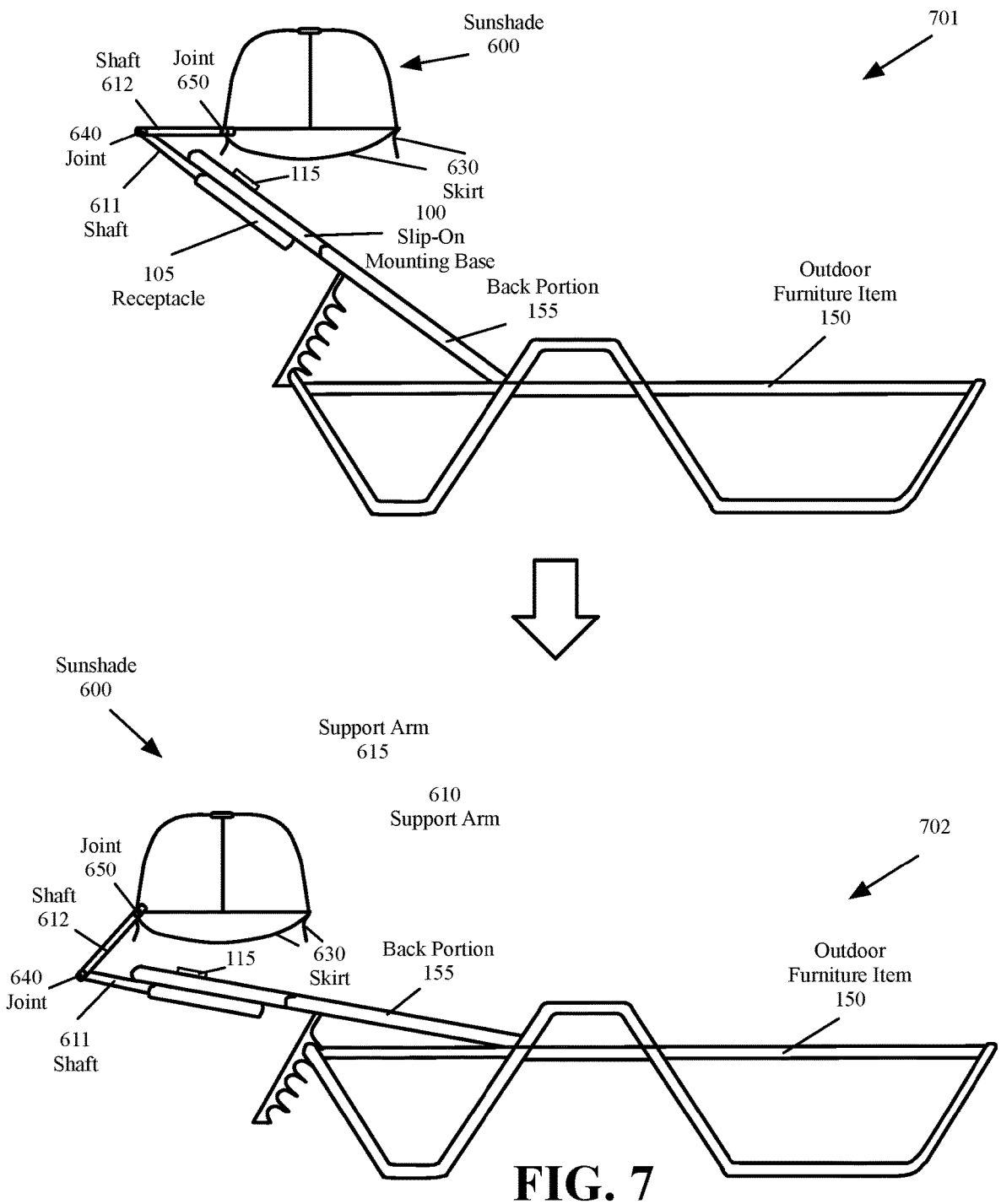
FIG. 7 illustrates side elevation views of the sunshade of FIG. 6 that is attached to an item of outdoor furniture by a slip-on mounting base, according to various aspects of the present embodiments.

FIG. 7 illustrates side elevation views of the sunshade of FIG. 6 that is attached to an item of outdoor furniture by a slip-on mounting base, according to various aspects of the present embodiments. FIG. 7, in two stages 701 and 702, shows how a sunshade such as the sunshade 600 of FIG. 6 may be attached to a slip-on mounting base to provide shade and/or privacy.

In stage 701, the shafts 611 of the sunshade's support arms may be inserted into the receptacles 105 of the slip-on mounting base 100 (only one of the two support arms and one of the two receptacles are shown in the side elevation views of FIG. 7). In this stage, the back portion 155 of the outdoor furniture item 150 is at an angle between the vertical and horizontal positions.

As shown, the shafts 612 may be rotated around the corresponding joints 640 to position the sunshade 600 in a proper position above the back portion 155 of the furniture item 150. In addition to, or in lieu of, rotating the shafts 612 around the joints 640, the sunshade 600 may also be rotated around the joins 650 to keep the sunshade 600 at a desired position.

In stage 702, the back portion 155 of the furniture item 150 may be lowered to be closer to a horizontal position (e.g., to allow a person to lie down on the furniture). As shown, the shafts 612 may be further rotated around the joints 640 and/or the sunshade 600 may be further rotated around the joins 650 to keep the sunshade 600 at a desired position. In any of the two stages 701 and 702, the sunshade 600 may be rotated around the joints 650 and/or 640 to hide the pocket 115 (e.g., when a user may have stored items in the pocket and may want to temporarily leave the furniture item 150).

Figure 8A:
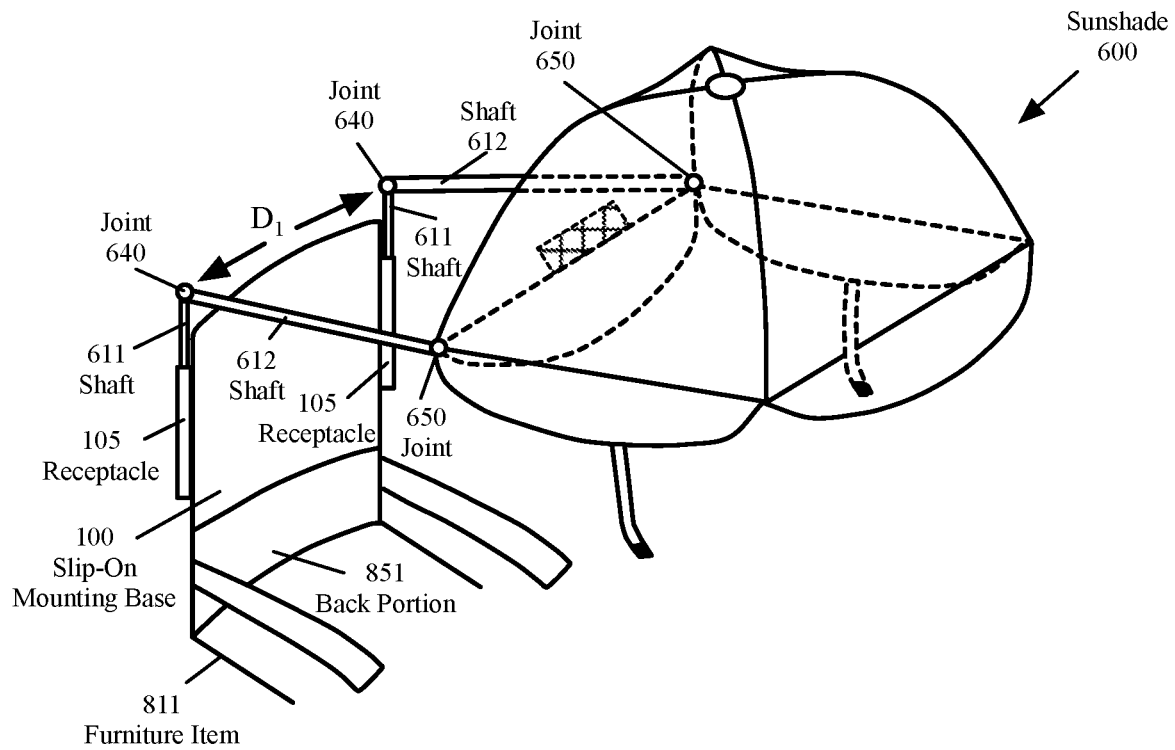
FIGS. 8A-8B are perspective views illustrating the sunshade of FIGS. 6-7 being connected to different sizes of outdoor furniture, according to various aspects of the present embodiments.
Figure 8B:
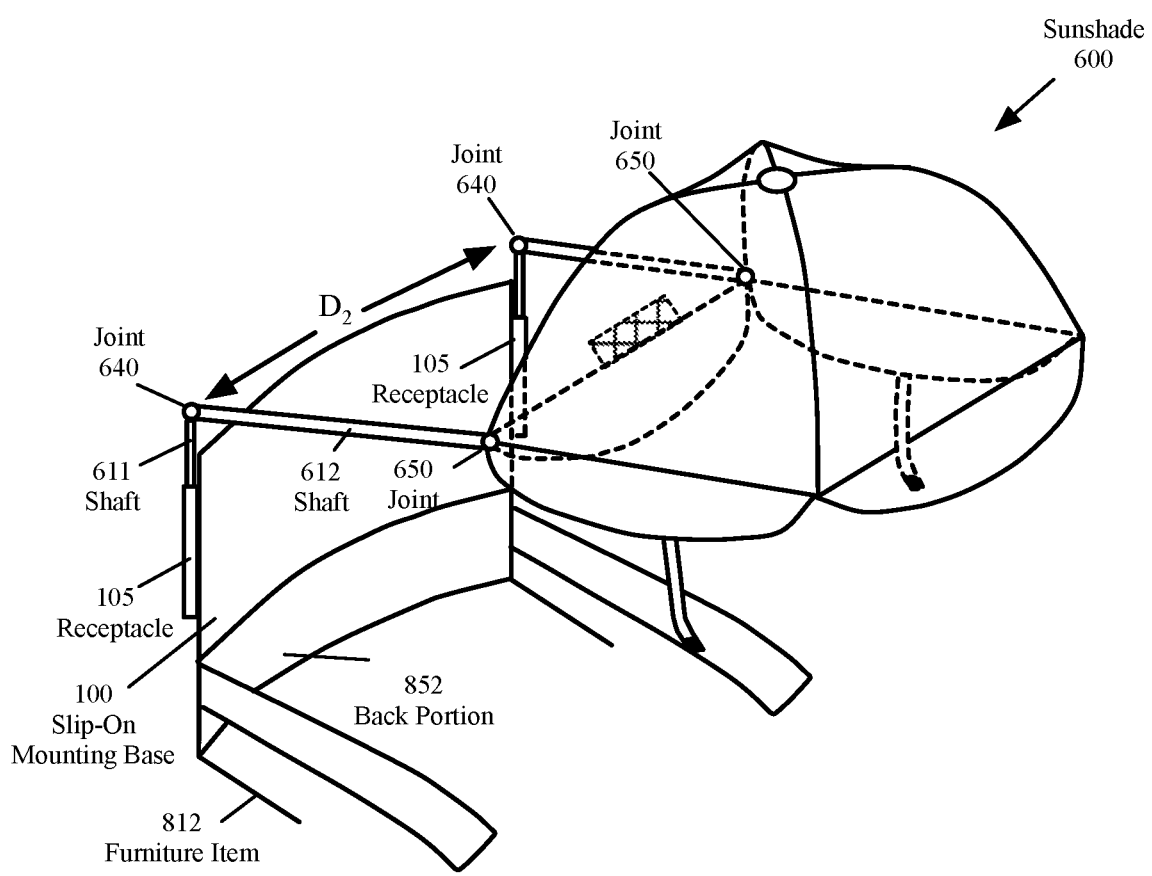

As the slip-on mounting base is stretched to fit different sizes of furniture, the receptacles may be at different distance from each other. The sunshade 600 of FIGS. 6-7 is configured to fit different sizes of outdoor furniture. FIGS. 8A and 8B are perspective views illustrating the sunshade of FIGS. 6-7 being connected to different sizes of outdoor furniture, according to various aspects of the present embodiments. With reference to FIGS. 8A and 8B, the width, $D_1$, of the back portion 851 of the furniture item 811 is narrower than the width, $D_2$, of the back portion 852 of the furniture item 812. As described above with reference to FIG. 1, the slip-on mounting base 100 is stretchable to fit the back portions that may have different sizes.

As shown, the shafts 612 may not only rotate around the corresponding joints 640, but they also move inwards and outwards such that the shafts 611 may get closer or farther from each other to fit the slip-on mounting base's receptacles 105 that may be at different distances (e.g., $D_1$ or $D_2$) from each other after the slip-on mounting base 100 is stretched to fit on the back of different sizes of furniture 811 or 812. For example, the shafts 611 are moved farther from each other in FIG. 8B than in FIG. 8A in order for the shafts 611 to fit into the receptacles 150 that are at a farther distance (e.g., $D_2$) from each other than the distance (e.g., $D_1$) in FIG. 8A.

Figure 8C:
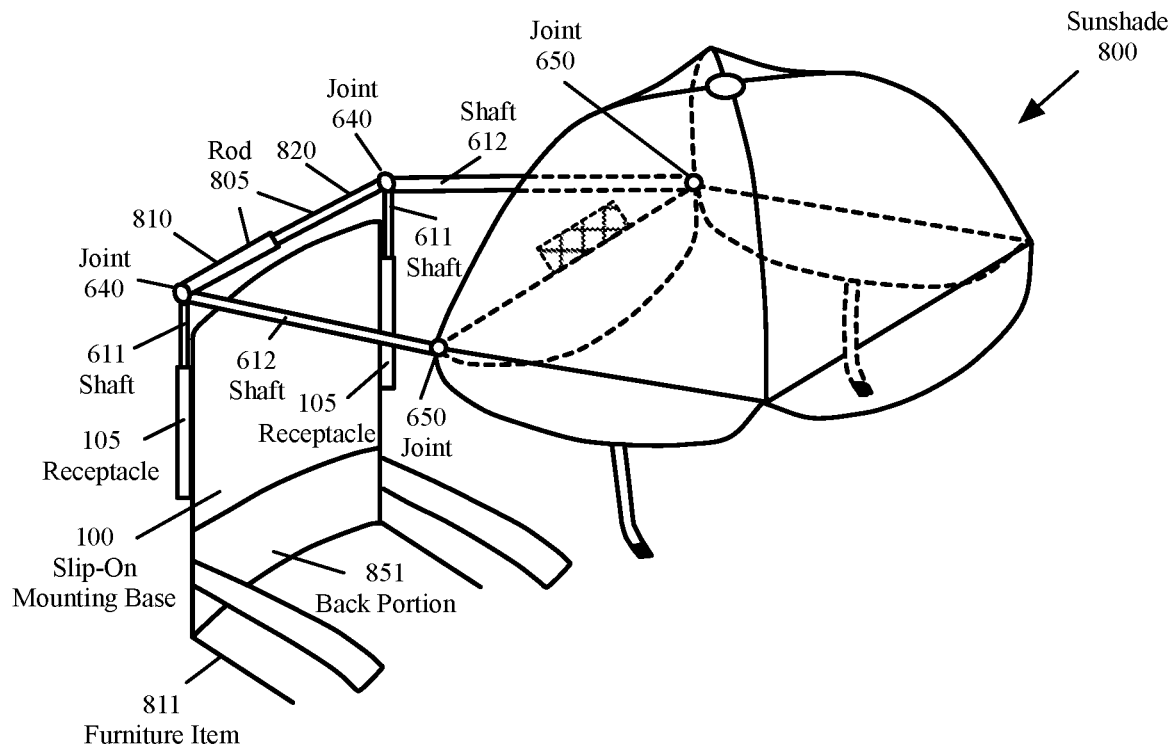
FIGS. 8C-8D are perspective views illustrating a sunshade, which includes a rod between two shafts, being connected to different sizes of outdoor furniture, according to various aspects of the present embodiments.
Figure 8D:
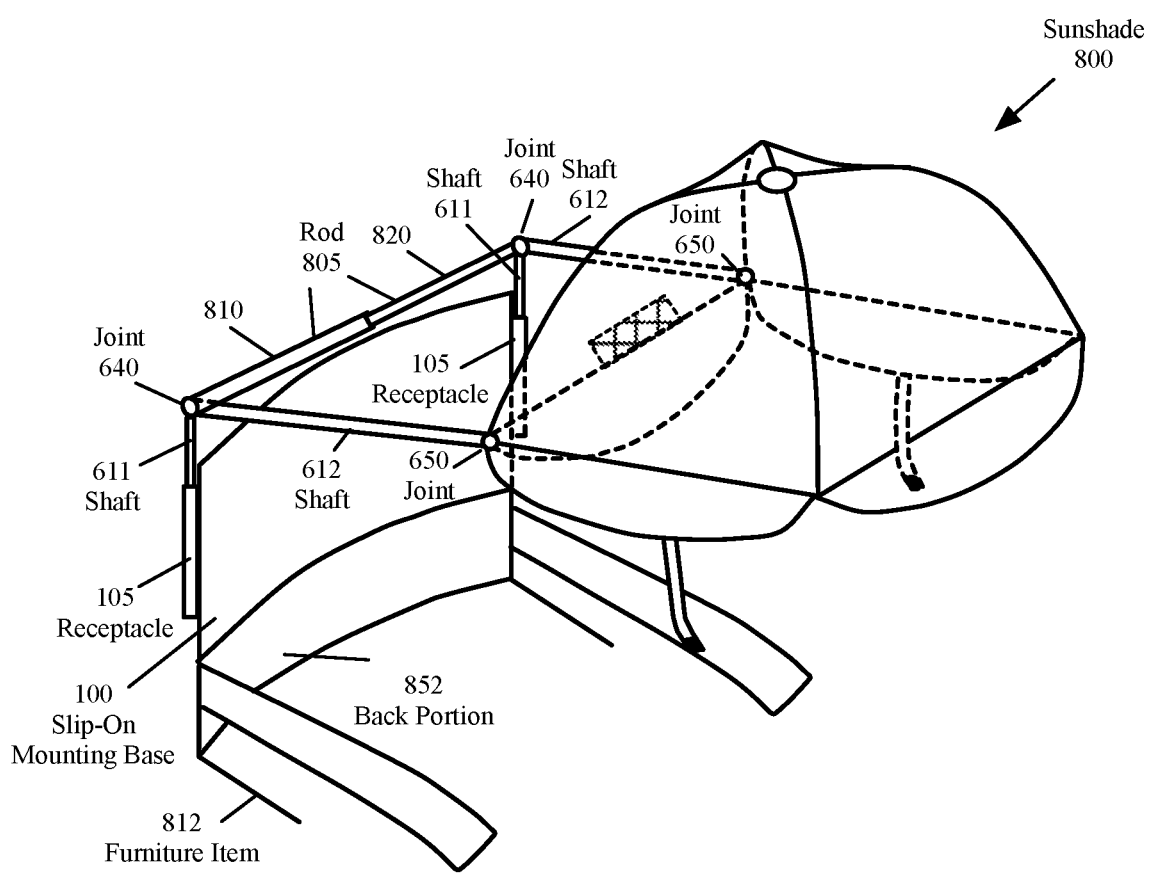

FIGS. 8C-8D are perspective views illustrating a sunshade, which includes a rod between two shafts, being connected to different sizes of outdoor furniture, according to various aspects of the present embodiments. With reference to FIGS. 8C-8D, the sunshade 800 may have similar components as the sunshade 600 of FIGS. 6-7 and 8A-8B. In addition, the sunshade 800 of FIGS. 8C-8D may include a rod 805 that may connect to the two joints 640.

The rod 805 may include multiple sections 810-820. Although only two sections are shown in FIGS. 8C and 8D, the rod 805 may include more than two sections in some embodiments. Some of the sections may be made hollow to reduce weight and/or to make the sections to be telescopically slidable within each other. The inner diameter of a section (e.g., section 810) of the rod 805 may be substantially similar to the outer diameter of a second, adjacent, section (e.g., section 820) such that section 820 may telescopically be slid within the section 810. The rod 805 may include a spring loaded lock (not shown) to hold or release a section that is slid into an adjacent section.

In addition to, or in lieu of the shafts 612 being able to pivot against the joins 650 to change the distance between the shafts 611, the telescopic mechanism of the rod 805 may allow the distance between the shafts 611 to be changed. Changing the distance between the shafts 611 may allow the shafts 611 to fit into the receptacles 105 when the slip-on mounting base 100 is stretched to fit different furniture (e.g., furniture items 811 and 812) with different sizes of the back portions (e.g., back portions 851 and 852).

Figure 9:
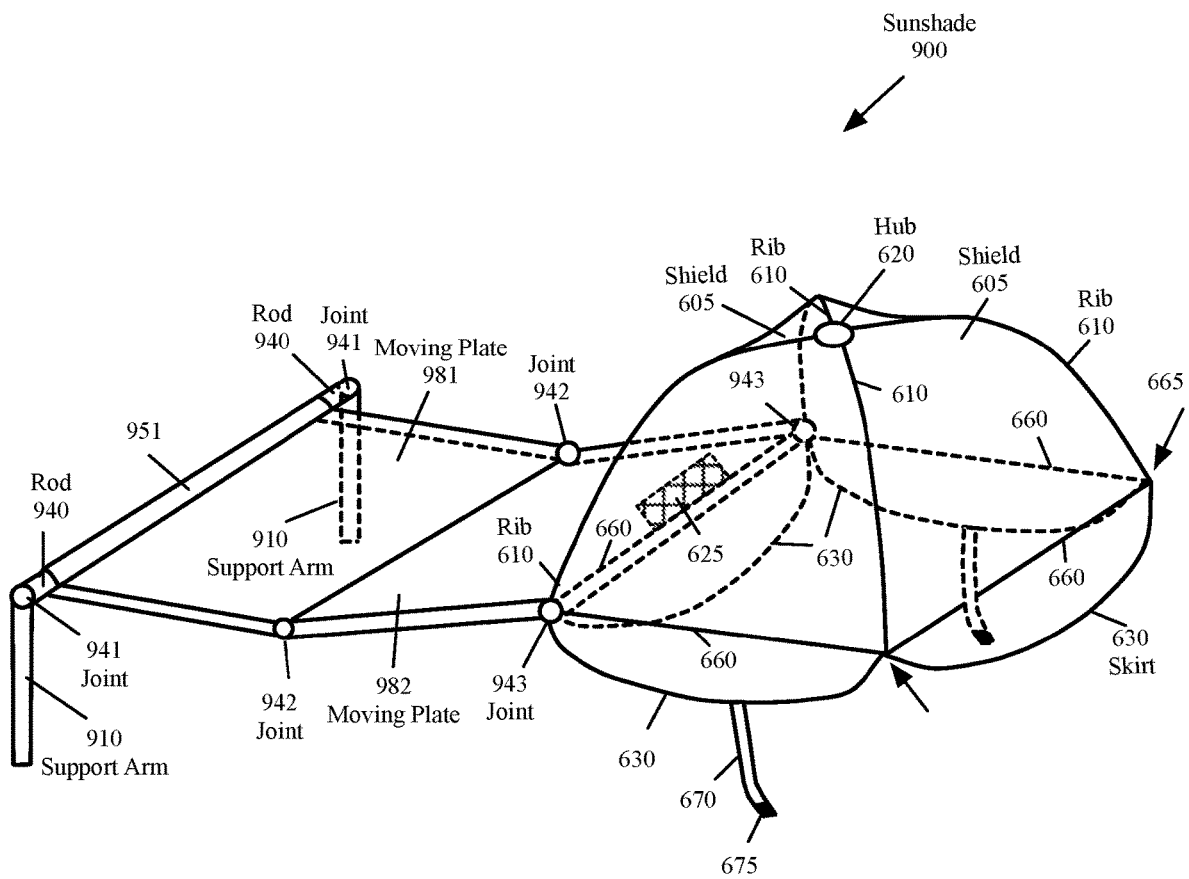
FIG. 9 is a perspective view of a dome shaped foldable sunshade and one or more movable plates that may be attached to a slip-on mounting base, according to various aspects of the present embodiments.

FIG. 9 is a perspective view of a dome shaped foldable sunshade that may be attached to a slip-on mounting base, according to various aspects of the present embodiments. With reference to FIG. 9, the shield 605, the ribs 610, the hub 620, the window 625, the straps 670, and the fasteners 675 may be similar to the corresponding components of FIG. 6.

The sunshade 900 may have one or more moving plates 981-982. Although two moving plates 981-982 are shown in the example of FIG. 9, the sunshade 900 may include any number of one or more moving plates. The moving plates 981-982 may provide additional shade and/or privacy. The moving plates 981-982 may also facilitate placing the sunshade 900 at a desired position.

The sunshade 900 may have the support arms 910. The support arms 910 may be connected to the moving plate 981 by the rod 940 and the joints 941. The moving plate 981, in some embodiments, may include a hollow portion 951, through which the rod 940 may pass. In the embodiments that have more than one moving plate, the adjacent moving plates 981 and 982 may be connected together by the joints 942. As shown, one of the sides 660 of the shield's base may be connected to one of the moving plates 982 by the joints 943. The rod 940, the joints 941, the joints 942, and/or the joints 943 may be used to rotate and position the sunshade 900 to a desired position. The joints 941, 942, and/or 943, in some embodiments, may be locked and unlocked, for example, as described above with reference to the joint 350 of FIG. 3B.

The rod 940 may be similar to the rod 805 of FIGS. 8C-8D. The rod 940 may include multiple sections (not shown). Some of the sections may be made hollow to reduce weight and/or to make the sections to be telescopically slidable within each other. For example, the inner diameter of a first section of the rod 940 may be substantially similar to the outer diameter of a second, adjacent, section such that the second section may be telescopically slid within the first section. The rod 940 may include a spring loaded lock (not shown) to hold or release a section that is slid into an adjacent section. The moving plates 981-982, in some embodiments, may be made of solid material, such as wood, straw, cardboard, metal, plastic, rubber, PVC, etc. The moving plates 981-982, in some embodiments, may include, or may be covered by, stretchable or non-stretchable fabric. The telescopic mechanism of the rod 940 may allow the distance of the support arms 910 to be changed from each other in order to adjust them to fit into the receptacles 105 (FIG. 1) when the slip-on mounting base 100 is stretched to fit different furniture with different sizes of the back portion.

Figure 10:
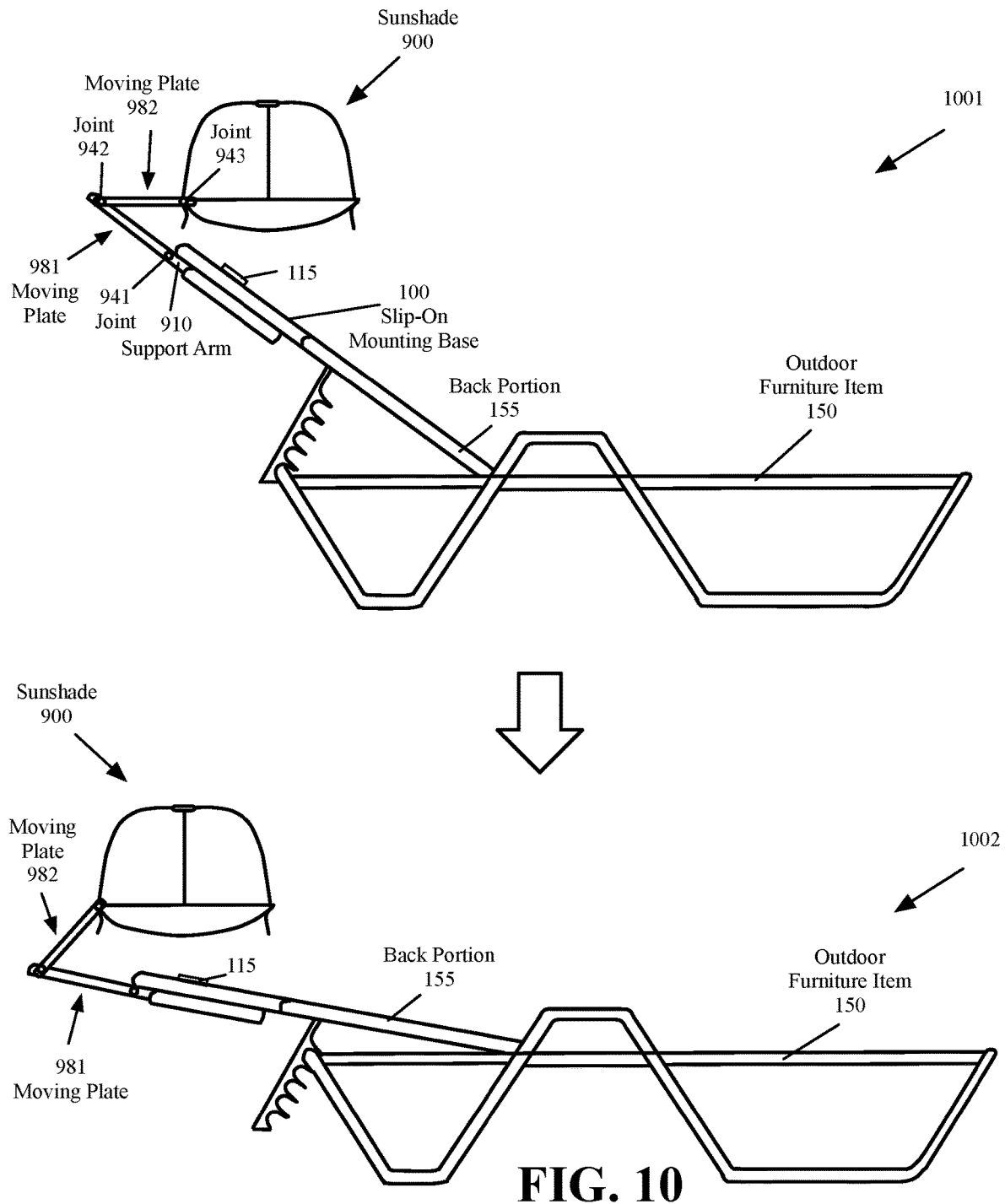
FIG. 10 illustrates side elevation views of the sunshade of FIG. 9 that is attached to an item of outdoor furniture by a slip-on mounting base, according to various aspects of the present embodiments.

FIG. 10 illustrates side elevation views of the sunshade of FIG. 9 that is attached to an item of outdoor furniture by a slip-on mounting base, according to various aspects of the present embodiments. FIG. 10, in two stages 1001 and 1002, shows how a sunshade such as the sunshade 900 of FIG. 9 may be attached to a slip-on mounting base to provide shade.

In stage 1001, the support arms 910 of the sunshade may be inserted into the receptacles 105 of the slip-on mounting base 100 (only one of the two support arms and one of the two receptacles are shown in the side elevation views of FIG. 10). In this stage, the back portion 155 of the outdoor furniture item 150 is at an angle between the vertical and horizontal positions.

As shown, the moving plate 982 may be rotated around the joints 942 to position the sunshade 1000 in a proper position above the back portion 155 of the furniture item 150. In addition to, or in lieu of, rotating the moving plate 982 around the joints 942, the sunshade 900 may also be rotated around the joins 941 and/or 943 to keep the sunshade 900 at a desired position.

In stage 1002, the back portion 155 of the furniture item 150 may be lowered to be closer to a horizontal position (e.g., to allow a person to lie down). As shown, the moving plate 982 may be rotated around the joints 942 and/or the sunshade 900 may be rotated around the joins 941 and/or 943 to keep the sunshade 900 at a desired position. In any of the two stages 1001 and 1002, the sunshade 900 may be rotated around the joints 941, 942, and/or 943 to hide the pocket 115 (e.g., when a user may have stored items in the pocket and may want to temporarily leave the furniture item 150).

Although the sunshades 600 (FIG. 6) and 900 of FIG. 9 are shown to have polygon bases, the bases in some embodiments may include curved sides and/or may be in a substantially circular or elliptic shape. In some of these embodiments where a portion or all of the base may be curved with no corners, the ribs 610 may be connected to the curved portion of the base (instead of being connected to the corners).

Figure 11:
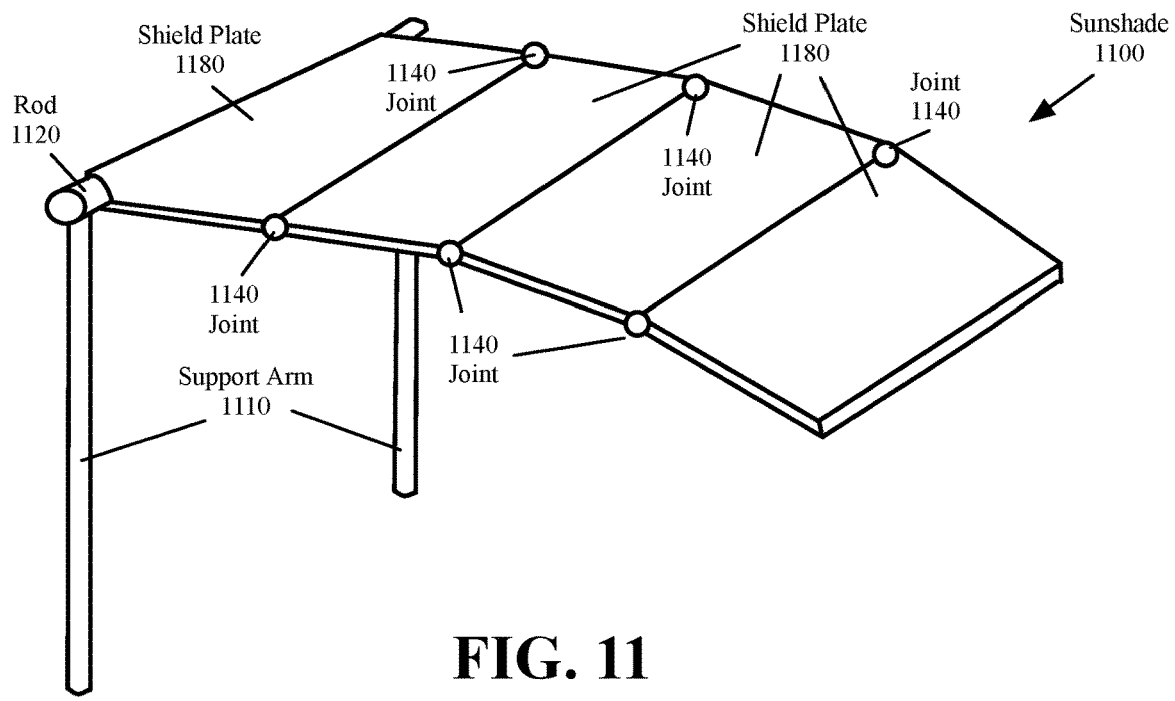
FIG. 11 is a perspective view of a sunshade with one or more movable plates that may be attached to a slip-on mounting base, according to various aspects of the present embodiments.

FIG. 11 is a perspective view of a sunshade with one or more movable plates that may be attached to a slip-on mounting base, according to various aspects of the present embodiments. With reference to FIG. 11, the sunshade 1100 may include a shield that has one or more moving plates 1180. In the embodiments that the sunshade 1100 has more than one shield plate 1180, the plates 1180 may rotate against each other around the joints 1140. The plates 1180 may have similar material as the plates 981-982 of FIG. 9. The joints 1140, in some embodiments, may be locked and unlocked, for example, as described above with reference to the joint 350 of FIG. 3B

The sunshade 1100 may include two or more support arms 1110. The support arms may be similar to the support arms 301 (FIG. 3A), 302 (FIG. 3B), or 303 (FIG. 3C). In the embodiment shown in FIG. 11, the support arms 1110 are similar to the support arms 301 of FIG. 3A.

In the example of FIG. 11, the support arms 1110 may be connected to each other by a rod 1120, which may go through a hollow portion of one of the plates 1180. Similar to the rod 805 of FIGS. 8C-8D and the rod 940 of FIG. 9, the rod 1120 may include multiple sections (not shown). Some of the sections may be made hollow to reduce weight and/or to make the sections to be telescopically slidable within each other. For example, the inner diameter of a first section of the rod 1120 may be substantially similar to the outer diameter of an adjacent second section such that the second section may be telescopically slid within the first section. The rod 1120 may include a spring loaded lock to hold or release a section that is slid into an adjacent section. The telescopic mechanism of the rod 1120 may allow the distance of the support arms 1110 from each other to be changed in order to adjust them to fit into receptacles 105 (FIG. 1) when the slip-on mounting base 100 is stretched to fit different furniture with different sizes of the back portion.

Figure 12:
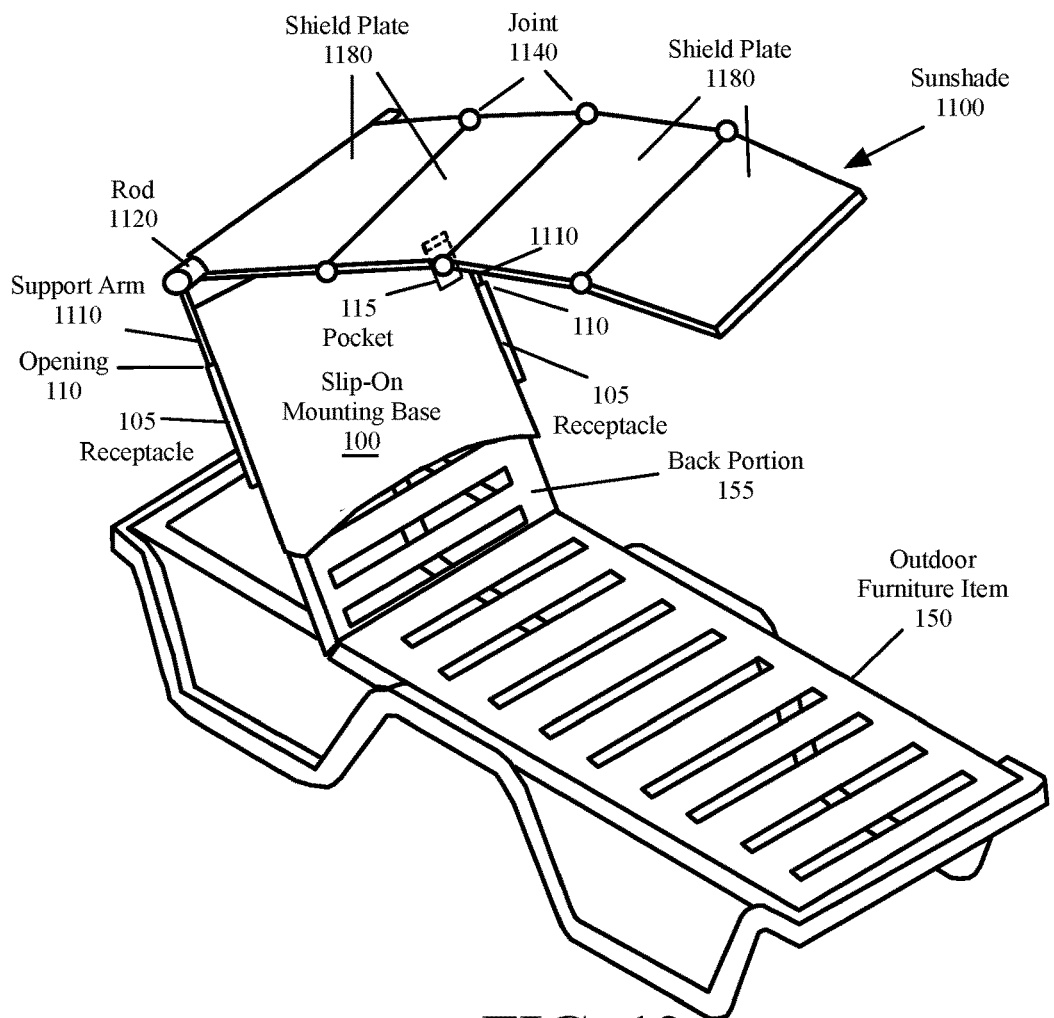
FIG. 12 illustrates a perspective view of the sunshade of FIG. 11 that is attached to an item of outdoor furniture by a slip-on mounting base, according to various aspects of the present embodiments.

FIG. 12 illustrates a perspective view of the sunshade of FIG. 11 that is attached to an item of outdoor furniture by a slip-on mounting base, according to various aspects of the present embodiments. As shown, the support arms 1110 of the sunshade 1100 may be inserted into the receptacles 105 of the slip-on mounting base 100 through the corresponding openings 110.

With reference to FIG. 12, the shield's plate(s) 1180 may be rotated around the axis of the rod 1120 and/or with respect to each other around the joint 1140 in order to provide shade and/or privacy. The shield's plate(s) 1180 may, for example, be lowered towards the furniture item 150 to provide shade, privacy, and/or to hide the optional pocket 115.

Figure 13:
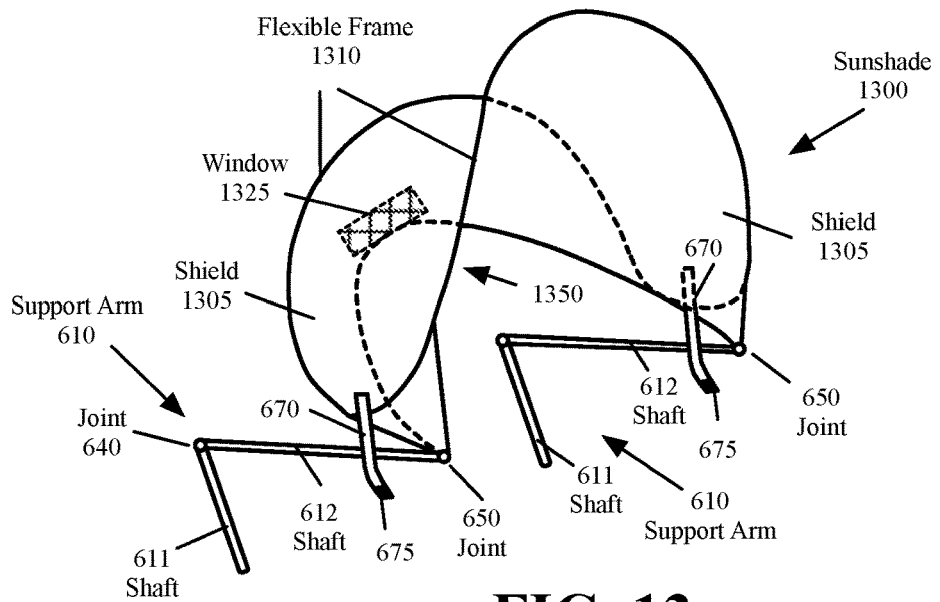
FIG. 13 is a perspective view of a single frame sunshade that may be attached to a slip-on mounting base, according to various aspects of the present embodiments.

FIG. 13 is a perspective view of a single frame sunshade that may be attached to a slip-on mounting base, according to various aspects of the present embodiments. With reference to FIG. 13, the sunshade 1300 may include a single frame 1310 that may be made of flexible material such as, for example, and without limitations, metal (e.g., steel, aluminum, etc.), rubber, carbon fiber, and/or fiberglass to allow the frame to easily fold or unfold.

The sunshade 1300 may include a shield 1305 that may be connected to the frame 1310. The sunshade 1300 may include an optional window 1325. The sunshade 1300 may include the optional straps 670 and the fasteners 675, which may be similar to the corresponding components of FIG. 6.

As shown, the sunshade 1300 may include the support arms 610. Each support arm 610 may include several shafts 611-612. Each shaft 611 may be connected to the adjacent shaft 612 by a joint 640. The shafts 650 may be connected to the shield 1305 by the joints 650. The support arms 610, the shafts, and the joints 640 and 650 may be similar to the corresponding components of FIG. 6.

The shafts 611 may be inserted into the receptacles 105 of a slip-on mounting base 100 (FIG. 1) and the other shafts 612 may be connected to the shield 1305 allowing the shield 1305 to be rotated around the joints 650 and/or the joints 640 to provide shade as the back of a furniture item is rotated between the vertical and horizontal positions. Similar to the shafts 612 of FIGS. 8A-8B, the shafts 612 of FIG. 13 may be pivoted with respect to the joints 650 to adjust the distance of the shafts 611 with respect to each other to fit the receptacles 105 when the slip-on mounting base 100 is stretched to fit different sizes of furniture.

Figure 14:
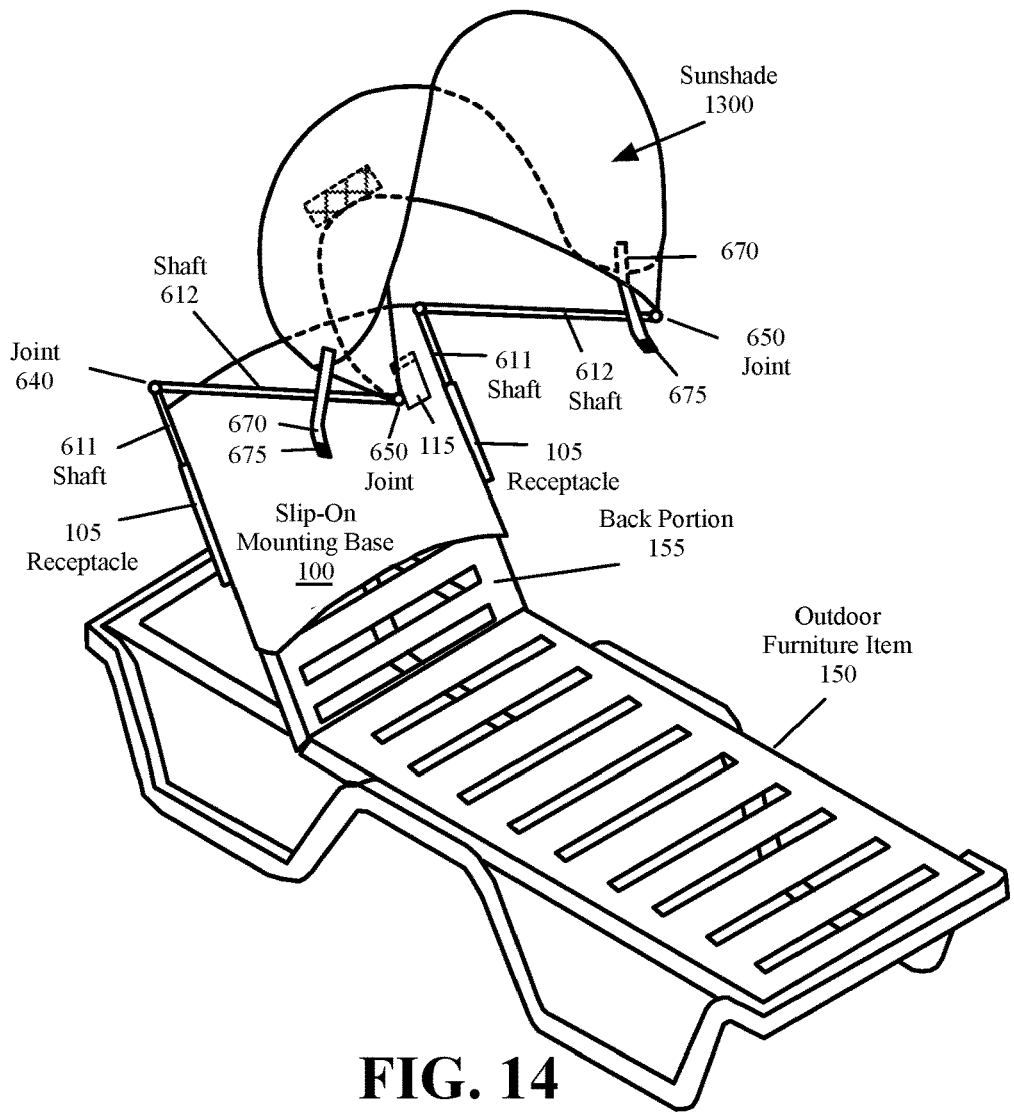
FIG. 14 illustrates a perspective view of the sunshade of FIG. 13 that is attached to an item of outdoor furniture by a slip-on mounting base, according to various aspects of the present embodiments.

FIG. 14 illustrates a perspective view of the sunshade of FIG. 13 that is attached to an item of outdoor furniture by a slip-on mounting base, according to various aspects of the present embodiments. As shown, the shafts 611 of the sunshade's support arms may be inserted into the receptacles 105 of the slip-on mounting base 100. The shafts 612 may be rotated around the corresponding joints 640 to position the sunshade 1300 in a proper position above the back portion 155 of the furniture item 150.

In addition to, or in lieu of, rotating the shafts 612 around the joints 640, the sunshade 1300 may also be rotated around the joins 650 to keep the sunshade 600 at a desired position. The sunshade 1300 may be rotated around the joints 650 and/or 640 to hide the optional pocket 115 (e.g., when a user may have stored items in the pocket and may want to temporarily leave the furniture item 150).

Figure 15A:
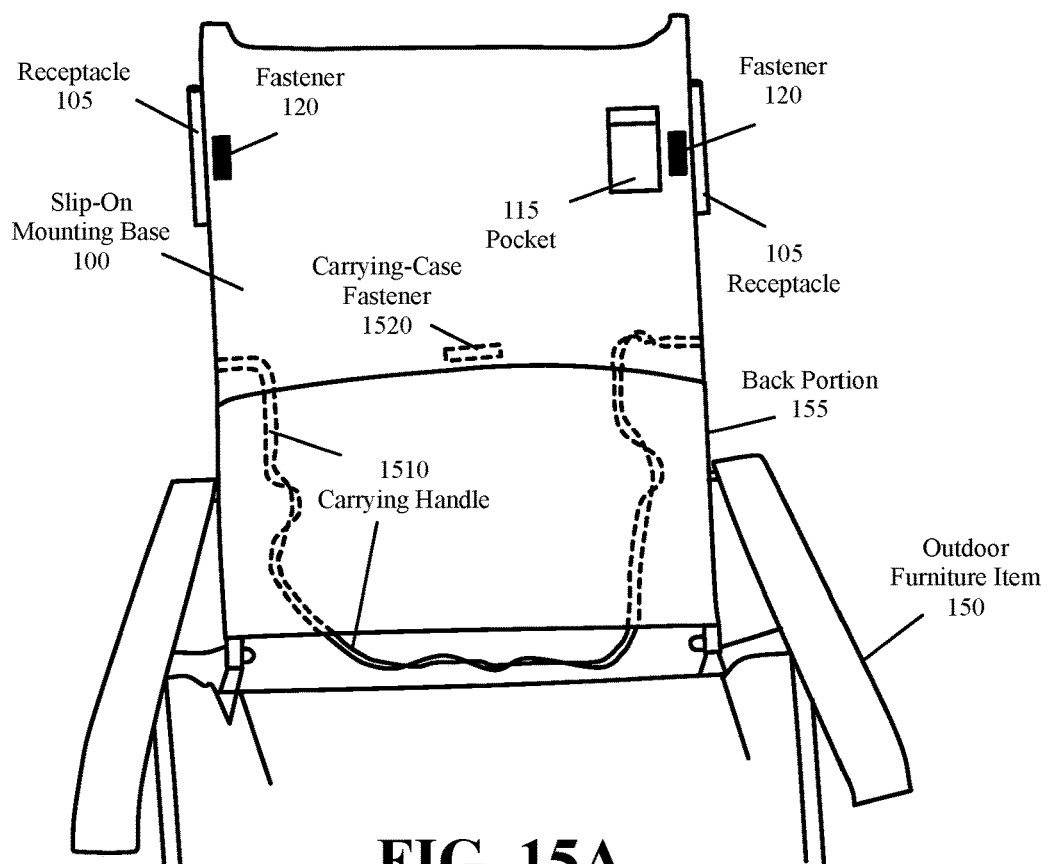
FIGS. 15A-15B are perspective views of a sunshade slip-on mounting base that includes one or more handles and one or more fasteners to convert the slip-on mounting base to a carrying case, according to various aspects of the present embodiments.
Figure 15B:
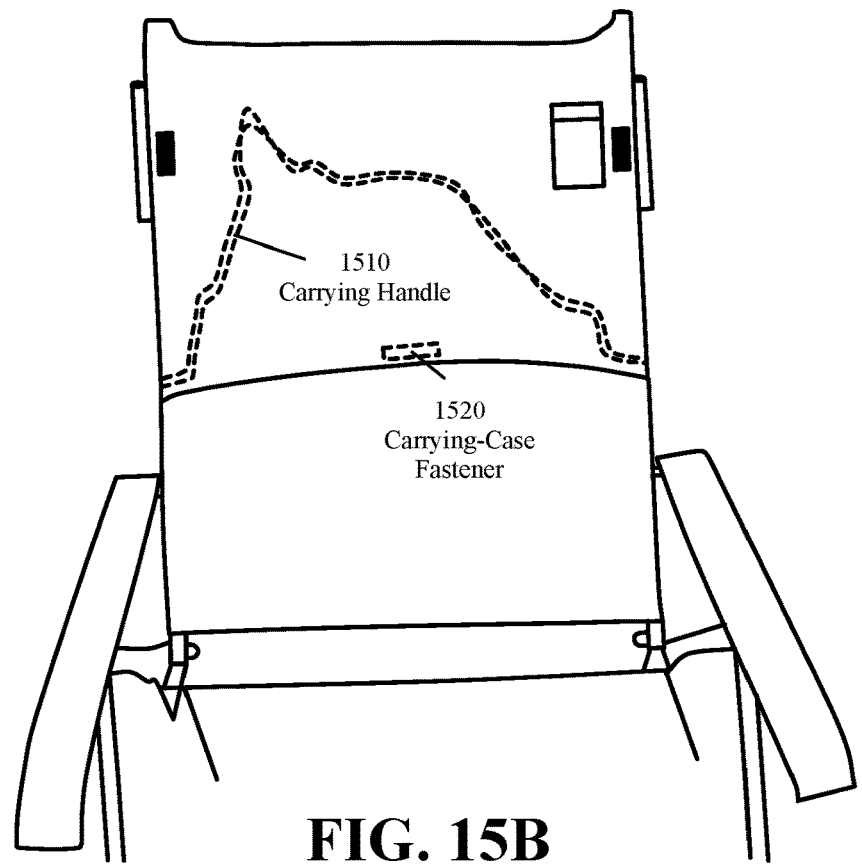

The slip-on mounting base, in some embodiments, may be converted into a carrying case. For example, the slip-on mounting base may include one or more carrying handles to carry the slip on mounting base. FIGS. 15A-15B are perspective views of a sunshade slip-on mounting base that includes one or more handles and one or more fasteners to convert the slip-on mounting base to a carrying case, according to various aspects of the present embodiments.

With reference to FIGS. 15A-15B, the slip-on mounting base 100 may include one or more carrying handles (or straps) 1510. In the example of FIGS. 15A-15B, the slip-on mounting base 100 includes one carrying handle 1510. The carrying handle 1510 may be configured such that the two ends of the carrying handle 1510 are inside the slip-on mounting base 100 when the slip-on mounting base 100 is slipped over the back portion 155 of a furniture item 150.

As shown in FIG. 15A, the carrying handle 1510 may be allowed to fall loose behind the back portion 155 of the furniture 150. As shown in FIG. 15B, the carrying handle 1510 may alternatively be tucked inside the slip-on mounting base's 100 cavity.

With further reference to FIGS. 15A-15B, the slip-on mounting base 100 may include one or more fasteners 1520 to allow the opening of the slip-on mounting base's 100 to be closed as described below with reference to FIG. 16. The fasteners 1520 may be located inside the cavity of the slip-on mounting base 100. The fasteners 1520 may be, for example, and without limitations, hook-and-loop fasteners, buckle straps, snap buttons, etc.

Figure 16:
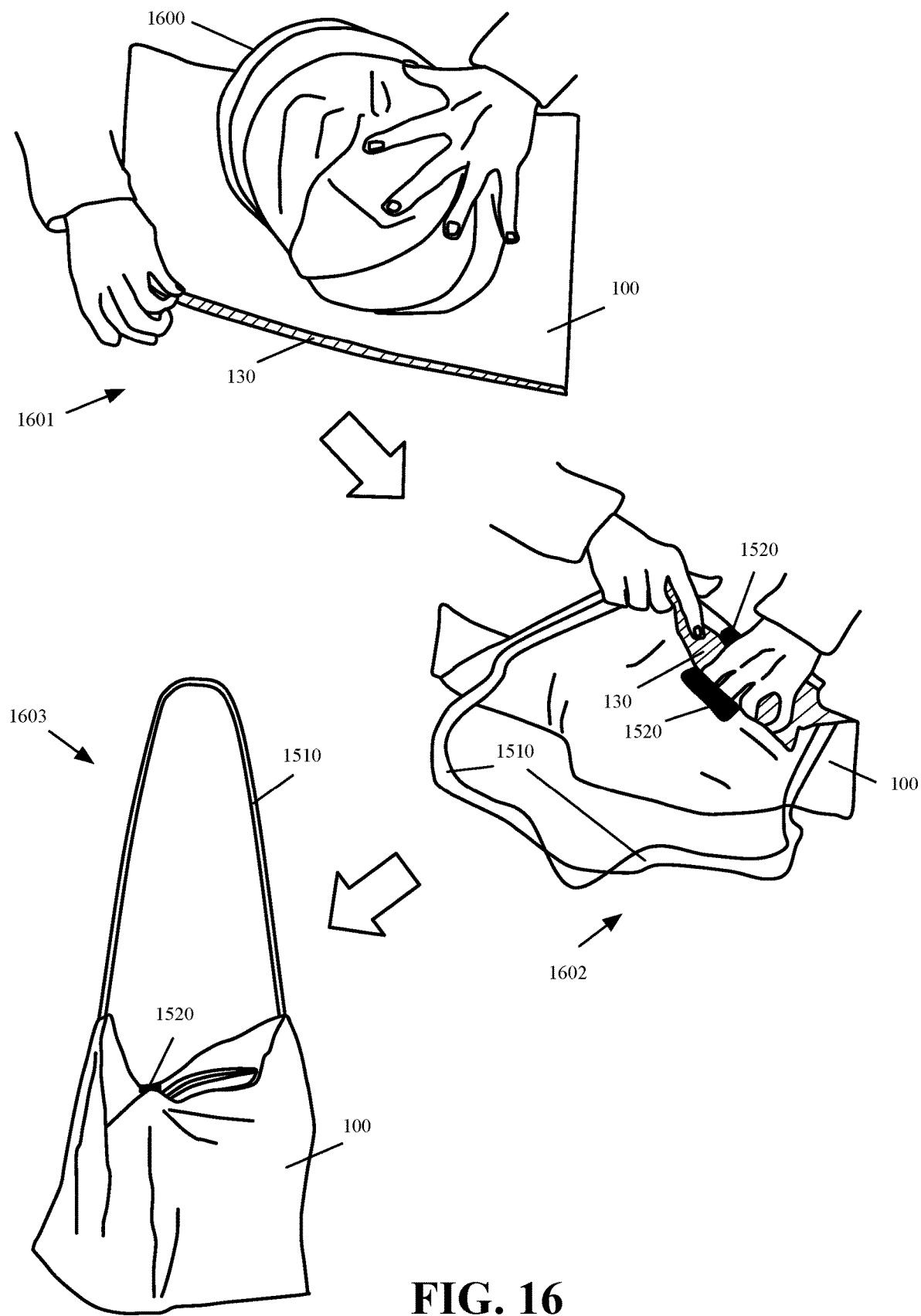
FIG. 16 illustrates perspective views of a sunshade being folded and placed inside a slip-on mounting base that is converted to a carrying case, according to various aspects of the present embodiments.

FIG. 16 illustrates perspective views of a sunshade being folded and placed inside a slip-on mounting base that is converted into a carrying case, according to various aspects of the present embodiments. FIG. 16 in three stages 1601-1603 illustrates how a slip-on mounting base 100 may be converted into a carrying case.

As shown in stage 1601, a sunshade 1600 (e.g., any of the sunshades described above) may be folded and placed against the exterior of the slip-on mounting base 100. In this stage, a user may have started to grab the opening 130 of the slip-on mounting base 100 to turn the slip-on mounting base 100 upside down.

In stage 1602, the slip-on mounting base 100 may be turned upside down and the sunshade 1600 (not shown) may be inserted inside the cavity of the slip-on mounting base 100. Since the slip-on mounting base 100 is turned upside down, the handle 1510 in this stage is on the outside of the slip-on mounting base 100. In addition, the fasteners 1520 may also be on the outside of the slip-on mounting base 100 in this stage.

In stage 1603, the slip-on mounting base 100 may be carried by the handle 1510. The handle may, for example, and without limitations, be used as a shoulder strap. In this stage, the fasteners 1520 may be connected to close the opening 130 of the slip-on mounting base 100. In some embodiments, the slip-on mounting base 100 may include two handles to further facilitate carrying the slip-on mounting base 100.

Figure 17:
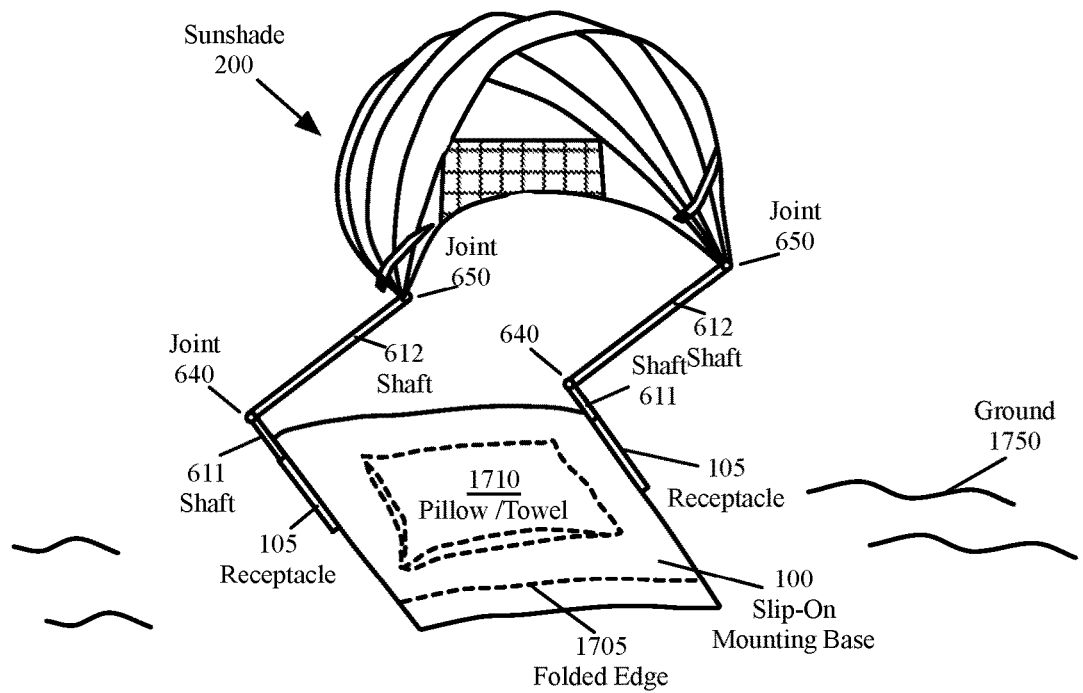
FIGS. 17 and 18 are perspective views of a slip-on mounting base that is used as a standalone mounting base to attach to a sunshade, according to various aspects of the present embodiments.
Figure 18:
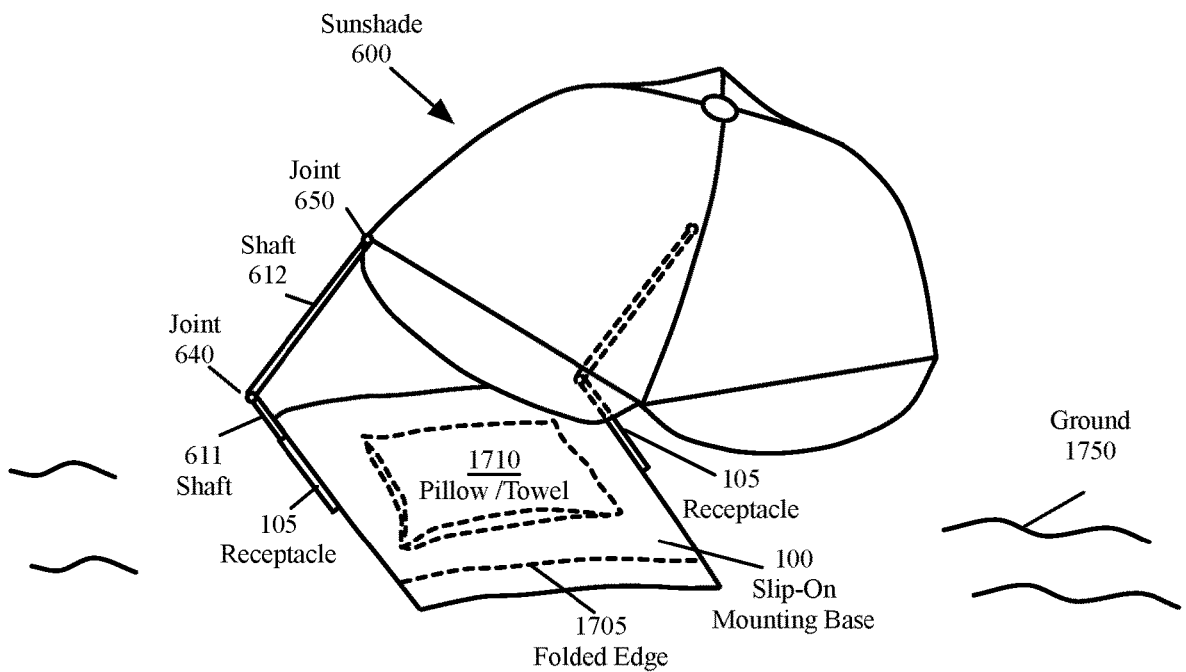

Although the slip-on mounting base of the present embodiments may be used to attach a sunshade to different items of furniture, the slip-on mounting base may also be placed on a surface such as ground, grass, sand, cement, concrete, wood, etc., and attach a sunshade to provide shade and privacy. FIGS. 17 and 18 are perspective views of a slip-on mounting base that is used as a standalone mounting base to attach to a sunshade, according to various aspects of the present embodiments.

With reference to FIGS. 17 and 18, the slip-on mounting base 100 may be placed on a surface 1750, e.g., on the ground, grass, sand, cement, concrete, wood, etc. To provide comfort, a soft item 1710 such as, for example, and without limitations, a pillow, a beach towel, an item of clothing, etc., may be placed inside the cavity of the slip-on mounting base 100 (e.g., to support the head of a person). To prevent dirt and sand to get into the cavity of the slip-on mounting base 100, the edge 1705 of the slip-on mounting base 100 may be folded to close the cavity of the slip-on mounting base 100.

In the example of FIGS. 17 and 18 the sunshades 200 and 600 may have support arms with shafts 611 and 612. In other embodiments, the sunshades may have any other types of supporting arms described herein. As shown, the shafts 611 may be placed in the receptacles 105. The shaft 611, the shaft 612, and/or the corresponding sunshades 200 or 600 may be rotated around the joints 640 and/or 650 to position the sunshades 200 or 600 at a desired angle to provide shade and privacy. Other sunshades described herein may also be attached to the slip-on mounting base when the slip-on mounting base is placed on a surface rather than being placed on the back of a furniture item.

Figure 19:
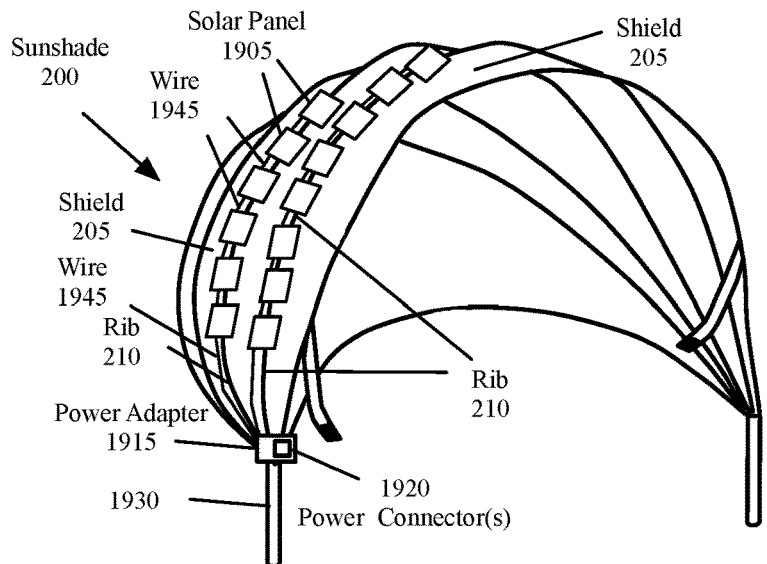
FIGS. 19-21 are perspective views of sunshades that include solar panels and a charging station, according to various aspects of the present embodiments.
Figure 20:
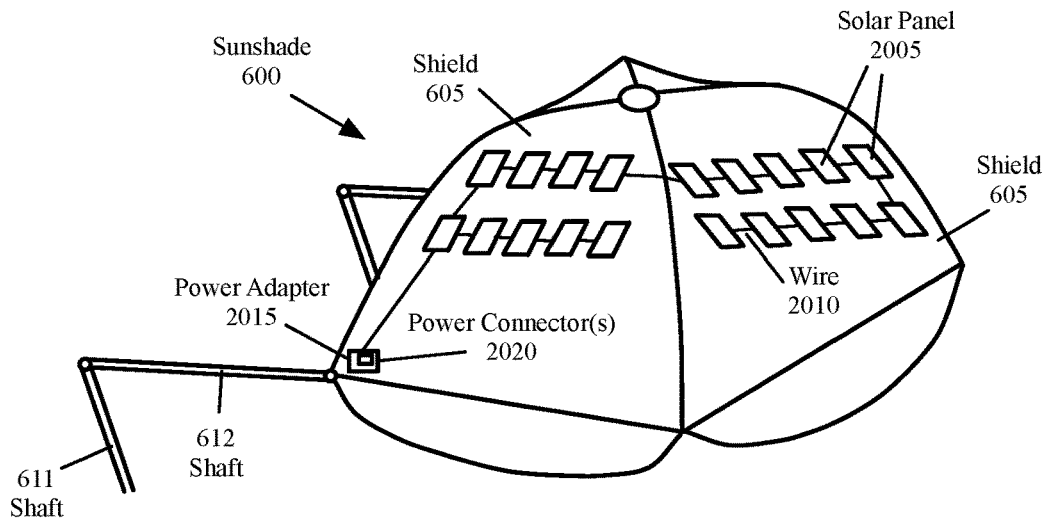
Figure 21:
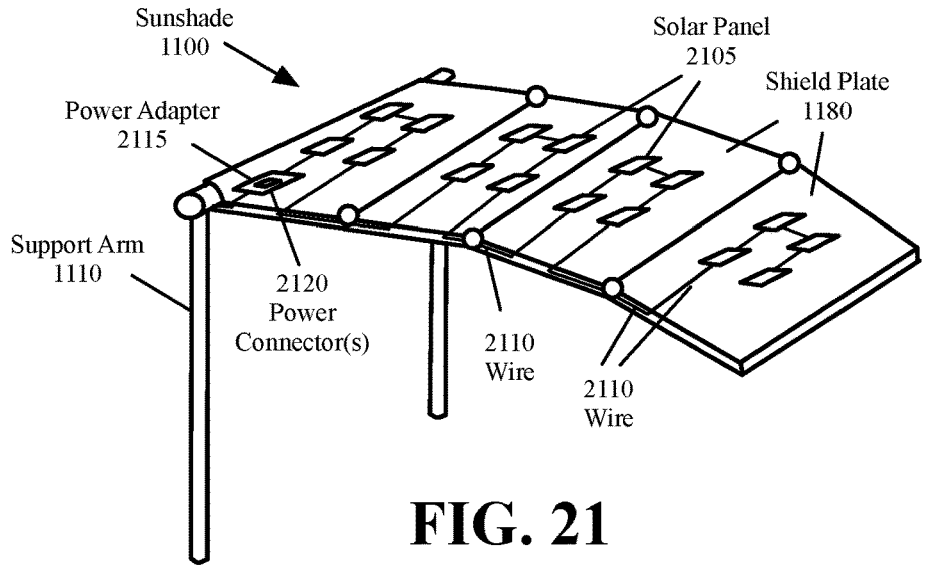

In some embodiments, the sunshades may include solar cells for charging electronic devices. FIGS. 19-21 are perspective views of sunshades that include solar panels and a charging station, according to various aspects of the present embodiments. In the examples of FIGS. 19-21 three sunshades 200, 600, and 1100 of the present embodiments are shown to be configured with solar panels. Other sunshades of the present embodiments may be configured similarly to include solar panels.

With reference to FIG. 19, the solar panels 1905 may be attached to the shield 205. Each solar panel 1905 may include several solar cells. The solar cells may be photovoltaic (PV) cells that may convert the solar energy into electricity. In some embodiments, the solar panels 1905 may be attached to the shield 205 along one or more of the ribs 210 to facilitate the folding of the shield 205. For example, in some embodiments, two rows of the solar panels 1905 may be attached in an inverted V shapes along one or more ribs 210.

With further reference to FIG. 19, the solar panels 1905 may be connected by the wires 1945 in series, in parallel, or a combination thereof. The wires 1945 may be brought into a power station that may include a power adapter 1915 and one or more power connectors 1920. The power adapter 1915 may be attached, for example, and without limitations, to one of the support arms 1930 or to the shield 205 at a location close to one of the support arms 1930.

The power adapter 1915 may provide power connections such as, for example, and without limitations, universal serial bus (USB) (e.g., USB type A, type B, type C), lightening, different laptops' direct current (DC) connectors, etc. The power adapter 1915, in some embodiments, may provide more than one type of power connectors to facilitate connecting different types and brands of electronic devices such as, for example, and without limitations, cellular phones, tablet computers, laptops, cameras, etc.

With reference to FIG. 20, the solar panels 2005 may be attached to the shield 605. The solar panel 2005 may be similar to the solar panels 1905 of FIG. 19. The solar panels 2005 may be connected by the wires 2010 in series, in parallel, or a combination thereof. The wires 2010 may be brought into charging station that may include a power adapter 2015.

The power adapter 2015 may be similar to the power adapter 1915 of FIG. 19. The power adapter 2015 may include one or more power connectors 2020, which may be similar to the power connector(s) 1920 of FIG. 19. The power adapter 2015 may be attached, for example, and without limitations, to one of the shafts 612 or to the shield 605 at a location close to one of the shafts 612.

With reference to FIG. 21, the solar panels 2105 may be attached to one or more of the shield plates 1180. The solar panel 2105 may be similar to the solar panels 1905 of FIG. 19. The solar panels 2105 may be connected by the wires 2110 in series, in parallel, or a combination thereof. The wires 2110 may be brought into a power station that includes a power adapter 2115.

The power adapter 2115 may be similar to the power adapter 1915 of FIG. 19. The power adapter 2115 may include one or more power connectors 2120, which may be similar to the power connector(s) 1920 of FIG. 19. The power adapter 2115 may be attached, for example, and without limitations, to one of the support arms 1110 or to a shield plate 1180 at a location close to one of the support arms 1110.

In a first aspect, an article for providing shade is provided. The article comprises a sunshade comprising: a shield; a set of one or more ribs connected to the shield, the shield configured to fold and unfold around the set of ribs; and a plurality of support arms connected to the shield. The article also comprises a slip-on mounting base. The slip-on mounting base comprises a body defining a cavity and an opening, the body configured to receive a back portion of an item of outdoor furniture into the cavity through the opening, the body comprising a stretchable material and configured to stretch to receive the back portion of different items of outdoor furniture with different sizes. The slip-on mounting base also comprises a plurality of receptacles attached to the body, each receptacle comprising an opening configured to receive a support arm of the sunshade, each receptacle configured to hold a corresponding support arm such that the shield, when unfolded, covers at least a portion of the back portion of the item of outdoor furniture.

In an embodiments of the first aspect, the body of the slip-on mounting base is made of a substantially rectangular piece of stretchable fabric comprising first and second opposite sides, the first and second opposite sides connected together to define the cavity and the opening.

In another embodiments of the first aspect, the body of the slip-on mounting base is made of a plurality of pieces of fabric connected together to make a substantially rectangular sheet of fabric comprising first and second opposite sides, where the first and second sides are connected together to define the cavity and the opening.

In another embodiments of the first aspect, the slip-on mounting base is configured to convert to a carrying case when the slip-on mounting base is not receiving the back of the item of outdoor furniture.

In another embodiments of the first aspect, the slip-on mounting base comprises: one or more handles for holding the slip-on mounting base when the slip-on mounting base is converted to a carrying case; and one or more fasteners to close the opening of the body when the slip-on mounting base is converted to a carrying case.

An embodiment of the first aspect further comprises a pocket attached to the body of the slip-on mounting base and configured to receive one or more personal objects substantially having a same size as a cellular phone, where the pocket is attached to the body of the slip-on mounting base such that the pocket is covered by the shield when the plurality of support arms are inserted into the plurality receptacles and the shield is unfolded.

Another embodiment of the first aspect further comprises a set of one or more solar cells attached to the shield; and a power adapter connected to the set of solar cells, where the power adapter is configured to charge electronic devices connected to the power adapter.

In another embodiments of the first aspect, at least one of the solar cells is connected to the umbrella canopy over one of the ribs.

In another embodiments of the first aspect, the sunshade further comprises a set of one or more fasteners connected to the shield, where the slip-on mounting base comprises a set of one or more fasteners, where the fasteners of the sunshade are configured to be connected to the fasteners of the slip-on mounting base to secure the shield to the slip-on mounting base.

In another embodiments of the first aspect, each of the plurality of ribs has a generally U-shaped configuration and comprises first and second ends, where the first ends of ribs are connected together by a first connector and the second ends of the ribs are connected together by a second connector, where the ribs are rotatable relative to one another permitting the shield to fold and unfold around the plurality of ribs, where when two ribs in the plurality of ribs are rotated towards each other, a portion of the shield that is attached between the two ribs folds, and where when two ribs in the plurality of ribs are rotated away from each other, a portion of the shield that is attached between the two ribs unfolds.

In another embodiments of the first aspect, the shield has a polygon shape base comprising a plurality of corners, the sunshade further comprising: a hub, where the plurality of ribs are flexible and each comprises first and second ends, where the first ends of the plurality of ribs are connected to the hub and the second end of each rib is connected to a corner of the shield's base, where the shield is configured to unfold when the hub is pulled away from the shield's base, and where the shield is configured to fold when the hub is pushed towards the shield's base.

Another embodiment of the first aspect further comprises a plurality of skirts, where each skirt comprises a plurality of sides, and where a side of each skirt is connected to a side of the shield's polygon.

In another embodiments of the first aspect, the shield comprises an opening covered by a mesh, the shield's opening configured to allow wind to go through the shield when the sunshade is unfolded.

In another embodiments of the first aspect, the slip-on mounting base is made of flexible material comprising one or more of nylon, rubber, spandex, elastane, polyether-polyurea copolymer, and thermoplastic.

In another embodiments of the first aspect, the slip-on mounting base is made of a stretch fabric comprising a 4-way stretch fabric.

In another embodiments of the first aspect, the shield is made at least one of a nylon, vinyl, and polyester.

In another embodiments of the first aspect, the shield is made of a UV-resistant fabric.

In another embodiments of the first aspect, the ribs are made of flexible a material comprising one or more of metal, rubber, and fiberglass.

In another embodiments of the first aspect, the support arms are made of one or more of wood, metal, plastic, rubber, polyvinyl chloride (PVC).

In a second aspect, a portable slip-on mounting base for supporting a sunshade comprises a shield and a set of one or more support arms connected to the shield. The slip-on mounting base comprises: a body defining a cavity and an opening, the body configured to receive a back portion of an item of outdoor furniture into the cavity through the opening, the body comprising a stretchable material and configured to stretch to receive the back portion of different items of outdoor furniture with different sizes; and a plurality of receptacles attached to the body, each receptacle comprising an opening configured to receive a support arm of the sunshade, each receptacle configured to hold the corresponding support arm such that the shield, when unfolded, covers at least a portion of the back portion of the item of outdoor furniture.

In an embodiment of the second aspect, the body of the slip-on mounting base is made of a substantially rectangular piece of stretchable fabric comprising first and second opposite sides, the first and second opposite sides connected together to define the cavity and the opening.

In another embodiment of the second aspect, the body of the slip-on mounting base is made of a plurality of pieces of fabric connected together to make a substantially rectangular sheet of fabric comprising first and second opposite sides, where the first and second sides are connected together to define the cavity and the opening.

In another embodiment of the second aspect, the slip-on mounting base is configured to convert to a carrying case when the slip-on mounting base is not receiving the back of the item of outdoor furniture.

In another embodiment of the second aspect, the slip-on mounting base comprises: one or more handles for holding the slip-on mounting base when the slip-on mounting base is converted to a carrying case; and one or more fasteners to close the opening of the body when the slip-on mounting base is converted to a carrying case.

An embodiment of the second aspect further comprises: a pocket attached to the body of the slip-on mounting base and configured to receive one or more personal objects substantially having a same size as a cellular phone, where the pocket is attached to the body of the slip-on mounting base such that the pocket is covered by the shield when the plurality of support arms are inserted into the plurality receptacles and the shield is unfolded.

In another embodiment of the second aspect, the sunshade further comprises a set of one or more fasteners connected to the shield, where the slip-on mounting base comprises a set of one or more fasteners, where the fasteners of the sunshade are configured to be connected to the fasteners of the slip-on mounting base to secure the shield to the slip-on mounting base.

In another embodiment of the second aspect, the slip-on mounting base is made of flexible material comprising one or more of nylon, rubber, spandex, elastane, polyether-polyurea copolymer, and thermoplastic.

In another embodiment of the second aspect, where the slip-on mounting base is made of a stretch fabric comprising a 4-way stretch fabric.

In another embodiment of the second aspect, the shield is made at least one of a nylon, vinyl, and polyester.

In a third aspect, a method of attaching a sunshade to an item of furniture by a portable slip-on mounting base is provided. The sunshade comprises a shield and a set of one or more support arms connected to the shield. The slip-on mounting base is made of stretchable material and comprises a stretchable body and a plurality of receptacles attached to the body, the body defining a cavity and an opening, each receptacle comprising an opening configured to receive a support arm of the sunshade. The method comprises stretching the body to receive a back portion of an item of outdoor furniture into the cavity through the opening, placing each of one or more support arms of the sunshade in a corresponding receptacle of the slip-on mounting base, and unfolding the shield of the sunshade to cover at least a portion of the back portion of the item of outdoor furniture.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure.

What is claimed is:

1. An article for providing shade, the article comprising:
   a sunshade comprising:
      a shield comprising a set of one or more fasteners;
      a set of one or more ribs connected to the shield, the shield configured to fold and unfold around the set of ribs; and
      a plurality of support arms connected to the shield;
   a slip-on mounting base comprising:
      a body defining a cavity and an opening, the body configured to receive a back portion of an item of outdoor furniture into the cavity through the opening, the body comprising a stretchable material and configured to stretch to receive the back portion of different items of outdoor furniture with different sizes;
      a plurality of receptacles attached to the body, each receptacle comprising an opening configured to receive a support arm of the sunshade, each receptacle configured to hold a corresponding support arm such that the shield, when unfolded, covers at least a portion of the back portion of the item of outdoor furniture; and
      a set of one or more fasteners configured to be connected to the fasteners of the shield to secure the shield to the slip-on mounting base.

2. The article of claim 1, wherein the body of the slip-on mounting base is made of one or more pieces of stretchable fabric comprising first and second opposite sides, the first and second opposite sides connected together to form the cavity and the opening.

3. The article of claim 1 further comprising:
a pocket attached to the body of the slip-on mounting base and configured to receive one or more personal objects,
wherein the pocket is attached to the body of the slip-on mounting base such that the pocket is covered by the shield when the plurality of support arms are inserted into the plurality receptacles and the shield is unfolded.

4. The article of claim 1 further comprising:
a set of one or more solar cells attached to the shield; and
a power adapter connected to the set of solar cells,
wherein the power adapter is configured to charge electronic devices connected to the power adapter.

5. The article of claim 1,
wherein each of the plurality of ribs has a generally U-shaped configuration and comprises first and second ends, wherein the first ends of the plurality of ribs are connected together by a first connector and the second ends of the plurality of ribs are connected together by a second connector, wherein the ribs are rotatable relative to one another permitting the shield to fold and unfold around the plurality of ribs, and
wherein when two ribs in the plurality of ribs are rotated towards each other, a portion of the shield that is attached between the two ribs folds, and wherein when two ribs in the plurality of ribs are rotated away from each other, the portion of the shield that is attached between the two ribs unfolds.

6. The article of claim 1, wherein the shield comprises an opening covered by a mesh, the shield's opening configured to allow wind to go through the shield when the sunshade is unfolded.

7. The article of claim 1, wherein the slip-on mounting base is made of flexible material comprising one or more of nylon, rubber, spandex, elastane, polyether-polyurea copolymer, and thermoplastic.

8. The article of claim 1, wherein the slip-on mounting base is made of a stretch fabric comprising a 4-way stretch fabric.

9. The article of claim 1, wherein the shield is made at least one of a nylon, vinyl, and polyester, wherein the shield comprises a UV-resistant fabric, wherein the ribs are made of flexible a material comprising one or more of metal, rubber, and fiberglass, and wherein the support arms are made of one or more of wood, metal, plastic, rubber, polyvinyl chloride (PVC).

10. An article for providing shade, the article comprising:
a sunshade comprising:
a shield;
a set of one or more ribs connected to the shield, the shield configured to fold and unfold around the set of ribs; and
a plurality of support arms connected to the shield;
a slip-on mounting base comprising:
a body defining a cavity and an opening, the body configured to receive a back portion of an item of outdoor furniture into the cavity through the opening, the body comprising a stretchable material and configured to stretch to receive the back portion of different items of outdoor furniture with different sizes; and
a plurality of receptacles attached to the body, each receptacle comprising an opening configured to receive a support arm of the sunshade, each receptacle configured to hold a corresponding support arm such that the shield, when unfolded, covers at least a portion of the back portion of the item of outdoor furniture;
wherein the slip-on mounting base is configured to convert to a carrying case when the slip-on mounting base is not receiving the back of the item of outdoor furniture, the slip-on mounting base further comprising:
one or more handles for holding the slip-on mounting base when the slip-on mounting base is converted to a carrying case; and
one or more fasteners to close the opening of the body when the slip-on mounting base is converted to a carrying case.

11. The article of claim 10, wherein the slip-on mounting base is made of flexible material comprising one or more of nylon, rubber, spandex, elastane, polyether-polyurea copolymer, and thermoplastic.

12. An article for providing shade, the article comprising:
a sunshade comprising:
a shield having a polygon shape base comprising a plurality of corners;
a set of one or more ribs connected to the shield, the shield configured to fold and unfold around the set of ribs; and
a plurality of support arms connected to the shield;
a slip-on mounting base comprising:
a body defining a cavity and an opening, the body configured to receive a back portion of an item of outdoor furniture into the cavity through the opening, the body comprising a stretchable material and configured to stretch to receive the back portion of different items of outdoor furniture with different sizes; and
a plurality of receptacles attached to the body, each receptacle comprising an opening configured to receive a support arm of the sunshade, each receptacle configured to hold a corresponding support arm such that the shield, when unfolded, covers at least a portion of the back portion of the item of outdoor furniture;
the sunshade further comprising:
a hub,
wherein the plurality of ribs are flexible and each comprises first and second ends, wherein the first ends of the plurality of ribs are connected to the hub and the second end of each rib is connected to a corner of the shield's base, and
wherein the shield is configured to unfold when the hub is pulled away from the shield's base, and wherein the shield is configured to fold when the hub is pushed towards the shield's base.

13. The article of claim 12 further comprising a plurality of skirts, wherein each skirt comprises a plurality of sides, and wherein a side of each skirt is connected to a side of the shield's polygon.

14. A portable slip-on mounting base for supporting a sunshade comprising a shield and a set of one or more support arms connected to the shield, the slip-on mounting base comprising:
a body defining a cavity and an opening, the body configured to receive a back portion of an item of outdoor furniture into the cavity through the opening, the body comprising a stretchable material and configured to stretch to receive the back portion of different items of outdoor furniture with different sizes;

a plurality of receptacles attached to the body, each receptacle comprising an opening configured to receive a support arm of the sunshade, each receptacle configured to hold the corresponding support arm such that the shield, when unfolded, covers at least a portion of the back portion of the item of outdoor furniture; and a set of one or more fasteners, wherein the fasteners of the slip-on mounting base are configured to be connected to a set of one or more fasteners of the shield to secure the shield to the slip-on mounting base.

15. The article of claim 14, wherein the body of the slip-on mounting base is made of one or more pieces of stretchable fabric comprising first and second opposite sides, the first and second opposite sides connected together to form the cavity and the opening.

16. The portable slip-on mounting base of claim 14 further comprising:
a pocket attached to the body of the slip-on mounting base and configured to receive one or more personal objects, wherein the pocket is attached to the body of the slip-on mounting base such that the pocket is covered by the shield when the plurality of support arms are inserted into the plurality receptacles and the shield is unfolded.

17. The portable slip-on mounting base of claim 14, wherein the slip-on mounting base is made of flexible material comprising one or more of nylon, rubber, spandex, elastane, polyether-polyurea copolymer, and thermoplastic.

18. The portable slip-on mounting base of claim 14, wherein the slip-on mounting base is made of a stretch fabric comprising a 4-way stretch fabric.

19. A portable slip-on mounting base for supporting a sunshade comprising a shield and a set of one or more support arms connected to the shield, wherein the slip-on mounting base comprises:
a body defining a cavity and an opening, the body configured to receive a back portion of an item of outdoor furniture into the cavity through the opening, the body comprising a stretchable material and configured to stretch to receive the back portion of different items of outdoor furniture with different sizes; and
a plurality of receptacles attached to the body, each receptacle comprising an opening configured to receive a support arm of the sunshade, each receptacle configured to hold the corresponding support arm such that the shield;
wherein the slip-on mounting base is configured to convert to a carrying case when the slip-on mounting base is not receiving the back of the item of outdoor furniture, wherein the slip-on mounting base further comprises:
one or more handles for holding the slip-on mounting base when the slip-on mounting base is converted to a carrying case; and
one or more fasteners to close the opening of the body when the slip-on mounting base is converted to a carrying case.

20. The portable slip-on mounting base of claim 19, wherein the slip-on mounting base is made of flexible material comprising one or more of nylon, rubber, spandex, elastane, polyether-polyurea copolymer, and thermoplastic.

* * * * *